US012782690B2

(12) United States Patent
Xu et al.

(10) Patent No.: US 12,782,690 B2
(45) Date of Patent: Nov. 3, 2026

(54) CAMERA OPTICAL LENS

(71) Applicant: AAC OPTICS (CHANGZHOU) CO., LTD., Changzhou (CN)

(72) Inventors: Minyi Xu, Changzhou (CN); Shunda Zhou, Changzhou (CN)

(73) Assignee: AAC OPTICS (CHANGZHOU) CO., LTD., Changzhou (CN)

( * ) Notice: Subject to any disclaimer, the term of this patent is extended or adjusted under 35 U.S.C. 154(b) by 232 days.

(21) Appl. No.: 18/731,394

(22) Filed: Jun. 3, 2024

(65) Prior Publication Data

US 2025/0251571 A1 Aug. 7, 2025

(30) Foreign Application Priority Data

Feb. 6, 2024 (CN) ......................... 202410172769.5

(51) Int. Cl.
*G02B 13/00* (2006.01)
*G02B 9/64* (2006.01)
*G02B 13/06* (2006.01)

(52) U.S. Cl.
CPC ........... *G02B 13/0045* (2013.01); *G02B 9/64* (2013.01); *G02B 13/06* (2013.01)

(58) Field of Classification Search
CPC .. G02B 13/00; G02B 13/001; G02B 13/0045; G02B 13/0006; G02B 13/0015; G02B 9/64; G02B 9/62; G02B 9/04; G02B 9/08; G02B 13/06; G02B 13/18; G02B 27/00; G02B 27/0025
USPC ........ 359/708, 713, 751, 755, 754, 682, 657
See application file for complete search history.

(56) References Cited

U.S. PATENT DOCUMENTS

2023/0065152 A1* 3/2023 Lai ....................... G02B 13/006
2023/0384561 A1* 11/2023 Lee .......................... G02B 9/64

* cited by examiner

*Primary Examiner* — Jie Lei
(74) *Attorney, Agent, or Firm* — Wiersch Law Group

(57) ABSTRACT

Disclosed is a camera optical lens including seven lenses. The seven lenses comprise: a first lens, a second lens, a third lens, a fourth lens, a fifth lens, a sixth lens, and a seventh lens. n1 denotes a refractive index of the first lens, d6 denotes a distance on-axis between an image side surface of the third lens and an object side surface of the fourth lens, TTL denotes a total track length, FOV denotes a field of view, f denotes a focal length, UH denotes an image height of 1.0H, R13 denotes a central curvature radius of an object side surface of the seventh lens, and R14 denotes a central curvature radius of an image side surface of the seventh lens, satisfying the following conditions: $n1\geq1.70$; $0.06\leq d6/TTL\leq0.08$; $100.00\leq(FOV\times f)/IH\leq130.00$; $-1.00\leq(R13+R14)/(R13-R14)\leq-0.70$.

16 Claims, 10 Drawing Sheets

Longitudinal aberration

Millimeter

CAMERA OPTICAL LENS

CROSS REFERENCE TO RELATED APPLICATIONS

The present application claims the benefit of priority under the Paris Convention to Chinese Patent Application No. 202410172769.5 filed on Feb. 6, 2024, which is incorporated herein by reference in its entirety.

TECHNICAL FIELD

The present disclosure relates to the field of optical lens, in particular to a camera optical lens suitable for terminal devices such as smart phones, digital cameras, unmanned aerial vehicles, and imaging devices such as monitors and PC lens.

BACKGROUND

With the emergence of various intelligent equipment in recent years, the demand for miniature camera optical lens is increasing day by day. Due to the shrinkage of pixel size of photosensitive devices plus the development trend of electronic products towards excellent performance with light and portable shape, miniature camera optical lens with desirable imaging quality has become a mainstream in the current market. In order to obtain better imaging quality, the miniature camera optical generally adopts a multi-piece lens structure. Moreover, with the development of technology and the increase of the diverse demands of users, and under this circumstances that the pixel area of photosensitive devices is shrinking steadily and the requirement of the system for the imaging quality is improving constantly, the seven-piece lens structure gradually appears in lens design. There is an urgent need for fish-eye wide-angle camera lenses with excellent optical characteristics, small size and fully corrected aberrations.

SUMMARY

In view of the above problems, a main object of the present disclosure is to provide a camera optical lens, which has excellent optical performance and meets the design requirements of large aperture, ultra-thinness and wide-angle.

In order to achieve the above object, the technical solution of the present disclosure provides a camera optical lens comprising seven lenses in total, where from the object side to the image side, the seven lenses comprise in sequence: a first lens having a negative refractive power, a second lens having a negative refractive power, a third lens having a positive refractive power, a fourth lens having a positive refractive power, a fifth lens having a positive refractive power, a sixth lens having a negative refractive power, and a seventh lens having a positive refractive power; wherein n1 denotes a refractive index of the first lens, d6 denotes a distance on-axis between an image side surface of the third lens and an object side surface of the fourth lens, TTL denotes a total track length of the camera optical lens, FOV denotes a field of view of the camera optical lens, f denotes a focal length of the camera optical lens, IH denotes an image height of 1.0H of the camera optical lens, R13 denotes a central curvature radius of an object side surface of the seventh lens, and R14 denotes a central curvature radius of an image side surface of the seventh lens, and the camera optical lens satisfies the following conditions: $n1\geq1.70$; $0.06\leq d6/TTL\leq0.08$; $100.00\leq(FOV\times f)/IH\leq130.00$; $-1.00\leq(R13+R14)/(R13-R14)\leq-0.70$.

In some embodiments, an Abe number of the fifth lens, denoted as v5, and an Abe number of the sixth lens, denoted as v6, satisfy the following condition: $v5-v6\geq35.00$.

In some embodiments, a thickness on-axis, denoted as d5, of the third lens and a thickness on-axis, denoted as d7, of the fourth lens satisfy the following condition: $0.35\leq d5/d7\leq0.70$.

In some embodiments, the camera optical lens further satisfies the following condition: $6.50\leq TTL/f\leq8.50$.

In some embodiments, the object side surface of the first lens is convex in a paraxial region, and the image side surface of the first lens is concave in the paraxial region. f1 denotes a focal length of the first lens, R1 denotes a central curvature radius of the object side surface of the first lens, R2 denotes a central curvature radius of the image side surface of the first lens, and d1 denotes a thickness on-axis of the first lens, and the camera optical lens further satisfies the following conditions: $-7.88\leq f1/f\leq-1.93$; $0.96\leq(R1+R2)/(R1-R2)\leq3.01$; $0.02\leq d1/TTL\leq0.14$.

In some embodiments, the object side surface of the second lens is convex in the paraxial region, and the image side surface of the second lens is concave in the paraxial region; f2 denotes a focal length of the second lens, R3 denotes a central curvature radius of the object side surface of the second lens, R4 denotes a central curvature radius of the image side surface of the second lens, and d3 denotes a thickness on-axis of the second lens, and the camera optical lens further satisfies the following conditions: $-8.54\leq f2/f\leq-2.48$; $2.23\leq(R3+R4)/(R3-R4)\leq7.55$; $0.02\leq d3/TTL\leq0.06$.

In some embodiments, the object side surface of the third lens is convex in the paraxial region, and the image side surface of the third lens is concave in the paraxial region; f3 denotes a focal length of the third lens, R5 denotes a central curvature radius of the object side surface of the third lens, R6 denotes a central curvature radius of the image side surface of the third lens, and d5 denotes a thickness on-axis of the third lens, and the camera optical lens further satisfies the following conditions: $3.23\leq f3/f\leq13.49$; $-7.02\leq(R5+R6)/(R5-R6)\leq-2.07$; $0.03\leq d5/TTL\leq0.12$.

In some embodiments, the object side surface of the fourth lens is concave in the paraxial region, and the image side surface of the fourth lens is convex in the paraxial region; f4 denotes a focal length of the fourth lens, R7 denotes a central curvature radius of the object side surface of the fourth lens, R8 denotes a central curvature radius of the image side surface of the fourth lens, and d7 denotes a thickness on-axis of the fourth lens, and the camera optical lens further satisfies the following conditions: $1.03\leq f4/f\leq3.77$; $0.62\leq(R7+R8)/(R7-R8)\leq1.88$; $0.06\leq d7/TTL\leq0.22$.

In some embodiments, the object side surface of the fifth lens is convex in the paraxial region, and the image side surface of the fifth lens is convex in the paraxial region; f5 denotes a focal length of the fifth lens, R9 denotes a central curvature radius of the object side surface of the fifth lens, R10 denotes a central curvature radius of the image side surface of the fifth lens, and d9 denotes a thickness on-axis of the fifth lens, and the camera optical lens further satisfies the following conditions: $1.22\leq f5/f\leq4.21$; $-0.15\leq(R9+R10)/(R9-R10)\leq0.08$; $0.08\leq d9/TTL\leq0.25$.

In some embodiments, the first lens is made of glass material and the fourth lens is also made of glass material.

The present disclosure has the following beneficial effects: The camera optical lens according to embodiments of the present disclosure has excellent optical characteristics, and has the characteristics of large aperture, ultra-thinness and wide angle, and is especially suitable for camera lens assemblies of mobile phones composed of camera elements such as CCD and CMOS for megapixel, WEB cameras and fish-eye camera lens for unmanned aerial vehicles.

BRIEF DESCRIPTION OF THE DRAWINGS

In order to illustrate the technical solutions in the embodiments of the present disclosure more clearly, the drawings used in the description of the embodiments are briefly described below. It is apparent that the drawings in the following description show only some embodiments of the present disclosure, and other drawings may be obtained by those of ordinary skill in the art based on these drawings without any creative efforts.

DETAILED DESCRIPTION OF THE EMBODIMENTS

Figure 1:
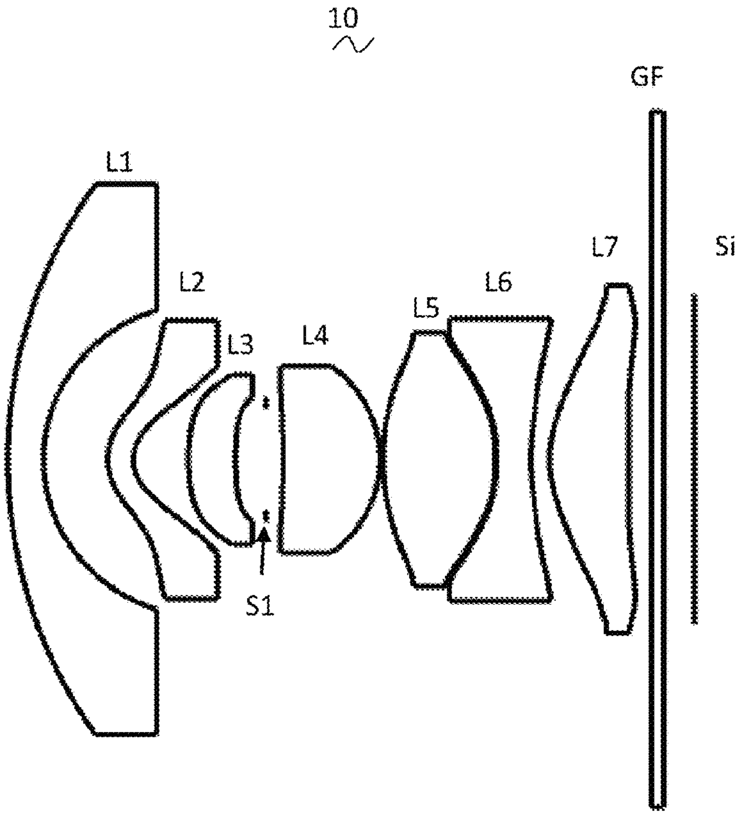
FIG. 1 is a schematic structural diagram of a camera optical lens according to a first embodiment of the present disclosure.

In order to make the object, technical solution and advantages of the embodiments of the present disclosure clearer, the following gives a detailed description of the embodiments of the present disclosure with reference to the accompanying drawings. However, those of ordinary skill in the art may understand that in the embodiments of the present disclosure, many technical details have been presented to facilitate a better understanding of the present disclosure by the reader. However, even without these technical details and the various variations and modifications based on the following embodiments, the technical solution claimed in the present disclosure can still be achieved.

With reference to FIGS. 1 to 16, the technical solution of the embodiments of the present disclosure provides camera optical lenses 10, 20, 30 and 40. FIGS. 1, 5, 9 and 13 show the camera optical lenses 10, 20, 30 and 40 of the embodiments of the present disclosure. Each of the camera optical lenses 10, 20, 30 and 40 includes seven lenses in total. Specifically, from the object side to the image side, the camera optical lens comprises in sequence: a first lens L1, a second lens L2, a third lens L3, an aperture S1, a fourth lens L4, a fifth lens L5, a sixth lens L6, and a seventh lens L7. An optical element such as an optical filter GF may be provided between the seventh lens L7 and an image surface Si.

The first lens L1 is made of glass material, the second lens L2 is made of plastic material, the third lens L3 is made of plastic material, the fourth lens L4 is made of glass material, the fifth lens L5 is made of plastic material, the sixth lens L6 is made of plastic material, and the seventh lens L7 is made of plastic material. The lenses may also be made of other materials.

The refractive index of the first lens L1 is defined as n1, and n1 satisfies the following condition: $n1 \geq 1.70$, which specifies the refractive index of the first lens L1. The first lens L1 is made of preferably a high refractive index material, which facilitates reduction of the aperture of the front end of the camera optical lens and improvement of the imaging quality.

The distance on-axis from the image side surface of the third lens L3 to the object side surface of the fourth lens L4 is defined as d6, and the total track length of the camera optical lens is defined as TTL. The following condition should be satisfied: $0.06 \leq d6/TTL \leq 0.08$, which specifies a ratio of the distance between two lenses at the aperture S1 to the total track length. When the condition is satisfied, the distance between the two lenses at the aperture S1 is large, and the light near the aperture S1 transits smoothly, which facilitate improvement of the image quality.

The field of view of the camera optical lens is defined as FOV, the focal length of the camera optical lens is defined as f, and the full-field image height of the camera optical lens is defined as IH. The following condition should be satisfied: $100.00 \leq (FOV \times f)/IH \leq 130.00$, which can warrant an ultra-large field of view and focal length, and achieve the medium-distance and long-distance imaging.

The central curvature radius of the object side surface of the seventh lens L7 is defined as R13, and the central curvature radius of the image side surface of the seventh lens L7 is defined as R14. The following condition should be satisfied: $-1.00 \leq (R13+R14)/(R13-R14) \leq -0.70$, which specifies the shape of the seventh lens L7. When the condition is satisfied, the field curvature of the system can be effectively balanced, so that the offset of the field curvature of the central field of view is less than 0.01 mm.

The Abee number of the fifth lens L5 is defined as v5, and the Abee number of the sixth lens L6 is defined as v6. The following condition should be satisfied: $v5-v6 \geq 35.00$, which specifies the difference between the Abee numbers of the fifth lens L5 and the sixth lens L6. When the condition is satisfied, the material properties can be effectively allocated, and the lateral color can be effectively corrected, allowing the lateral color to satisfy: $|LC|\leq 12$ μm.

The thickness on-axis of the third lens L3 is defined as d5, and the thickness on-axis of the fourth lens L4 is defined as d7. The following condition should be satisfied: $0.35\leq d5/d7\leq 0.70$, which specifies the ratio of a central thickness of the third lens L3 to a central thickness of the fourth lens L4. When the condition is satisfied, the total track length of the system can be advantageously compressed.

The total track length TTL and focal length f of the camera optical lens satisfy the following condition: $6.50\leq TTL/f\leq 8.50$, which specifies the telescopic ratio. When the telescopic ratio less than the upper limit of the conditional expression, the total track length can be controlled to be less, which facilitates miniaturization. When the telescopic ratio is greater than the lower limit of the conditional expression, the distortion and chromatic aberration on-axis can be easily corrected, thereby maintaining good optical performance.

Provided that the above conditions are all satisfied, the camera optical lenses 10, 20, 30, and 40 have good optical performance and can meet the design requirements of large aperture and wide-angle. Due to the characteristics of the camera optical lenses 10, 20, 30, and 40, these camera optical lenses are especially suitable for camera lens assemblies of mobile phones composed of camera elements such as CCD and CMOS for megapixel, WEB cameras and fish-eye camera lens for unmanned aerial vehicles.

Based on the above conditions and the functions intended to achieved, the characteristics of each lens are further detailed as follows.

The object side surface of the first lens L1 is convex in a paraxial region, the image side surface thereof is concave in the paraxial region, and the first lens L1 has a negative refractive power. The object side surface and the image side surface of the first lens L1 may also have other arrangements than the above convex-concave arrangement.

The focal length of the camera optical lens is defined as f, and the focal length of the first lens L1 is defined as f1. The following condition should be satisfied: $-7.88\leq f1/f\leq -1.93$, which specifies the ratio of the negative refractive power of the first lens L1 to the focal length of the camera optical lens. When the condition is satisfied, the first lens L1 has an appropriate negative refractive power, which is conducive to reducing the aberration of the system, and facilitates the development of the lens towards ultra-thinness and wide-angle. Preferably, the following condition shall be satisfied, $-4.92\leq f1/f\leq -2.41$.

The central curvature radius of the object side surface of the first lens L1 is defined as R1, and the central curvature radius of the image side surface of the first lens L1 is defined as R2. The following condition should be satisfied: $0.96\leq (R1+R2)/(R1-R2)\leq 3.01$, which reasonably controls the shape of the first lens L1, enabling the first lens L1 to effectively correct the spherical aberration of the system. Preferably, the following condition shall be satisfied, $1.53\leq (R1+R2)/(R1-R2)\leq 2.41$.

The thickness on-axis of the first lens L1 is defined as d1, and the total track length of the camera optical lens is defined as TTL. The following condition should be satisfied: $0.02\leq d1/TTL\leq 0.14$. Such condition facilitates the ultra-thinness of the camera optical lens. Preferably, the following condition shall be satisfied, $0.03\leq d1/TTL\leq 0.11$.

The object side surface of the second lens L2 is convex in the paraxial region, the image side surface thereof is concave in the paraxial region, and the second lens L2 has a negative refractive power. The object side surface and the image side surface of the second lens L2 may also have other arrangements than the above convex-concave arrangement.

The focal length of the camera optical lens is defined as f, and the focal length of the second lens L2 is defined as f2. The following condition should be satisfied: $-8.54\leq f2/f\leq -2.48$. Such condition controls the negative power of the second lens L2 to be within a reasonable range, which facilitates correction of the aberration of the optical system. Preferably, the following condition shall be satisfied, $-5.34\leq f2/f\leq -3.10$.

The central curvature radius of the object side surface of the second lens L2 is defined as R3, and the central curvature radius of the image side surface of the second lens L2 is defined as R4. The following condition should be satisfied: $2.23\leq (R3+R4)/(R3-R4)\leq 7.55$, which specifies the shape of the second lens L2. When the condition is satisfied, it facilitates the correction of chromatic aberration on-axis for the ultra-thin and wide-angle lenses. Preferably, the following condition shall be satisfied, $3.57\leq (R3+R4)/(R3-R4)\leq 6.04$.

The thickness on-axis of the second lens L2 is defined as d3, and the total track length of the camera optical lens is defined as TTL. The following condition should be satisfied: $0.02\leq d3/TTL\leq 0.06$. Such condition facilitates the ultra-thinness of the camera optical lens. Preferably, the following condition shall be satisfied, $0.03\leq d3/TTL\leq 0.05$.

The object side surface of the third lens L3 is convex in the paraxial region, the image side surface thereof is concave in the paraxial region, and the third lens L3 has a positive refractive power. The object side surface and the image side surface of the third lens L3 may also have other arrangements than the above convex-concave arrangement.

The focal length of the camera optical lens is defined as f, and the focal length of the third lens L3 is defined as f3. The following condition should be satisfied: $3.23\leq f3/f\leq 13.49$, which allows a reasonable allocation of focal power of the third lens, enabling the system to have better imaging quality and lower sensitivity. Preferably, the following condition shall be satisfied, $5.16\leq f3/f\leq 10.80$.

The central curvature radius of the object side surface of the third lens L3 is defined as R5, and the central curvature radius of the image side surface of the third lens L3 is defined as R6. The following condition should be satisfied: $-7.02\leq (R5+R6)/(R5-R6)\leq -2.07$, which specifies the shape of the third lens L3 and facilitates the forming of the third lens L3. When the condition is satisfied, it can mildly decrease the degree of refraction of light passing through the lens and effectively reduce the aberration. Preferably, the following condition shall be satisfied, $-4.39\leq (R5+R6)/(R5-R6)\leq -2.59$.

The thickness on-axis of the third lens L3 is defined as d5, and the total track length of the camera optical lens is defined as TTL. The following condition should be satisfied: $0.03\leq d5/TTL\leq 0.12$. Such condition facilitates the ultra-thinness of the camera optical lens. Preferably, the following condition shall be satisfied, $0.04\leq d5/TTL\leq 0.10$.

The object side surface of the fourth lens L4 is concave in the paraxial region, the image side surface thereof is convex in the paraxial region, and the fourth lens L4 has a positive refractive power. The object side surface and the image side surface of the fourth lens L4 may also have other arrangements than the above concave-convex arrangement.

The focal length of the camera optical lens is defined as f, and the focal length of the fourth lens L4 is defined as f4. The following condition should be satisfied: $1.03\leq f4/f\leq 3.77$, which allows a reasonable allocation of focal power of the fourth lens, enabling the system to have better imaging quality and lower sensitivity. Preferably, the following condition shall be satisfied, 1.65≤f4/f≤3.01.

The central curvature radius of the object side surface of the fourth lens L4 is defined as R7, and the central curvature radius of the image side surface of the fourth lens L4 is defined as R8. The following condition should be satisfied: 0.62≤(R7+R8)/(R7−R8)≤1.88, which specifies the shape of the fourth lens L4. When the condition is satisfied, it facilitates the correction of off-axis aberration for the ultra-thin and wide-angle lenses. Preferably, the following condition shall be satisfied, 0.99≤(R7+R8)/(R7−R8)≤1.50.

The thickness on-axis of the fourth lens L4 is defined as d7, and the total track length of the camera optical lens is defined as TTL. The following condition should be satisfied: 0.06≤d7/TTL≤0.22. Such condition facilitates the ultra-thinness of the camera optical lens. Preferably, the following condition shall be satisfied, 0.09≤d7/TTL≤0.18.

The object side surface of the fifth lens L5 is convex in the paraxial region, the image side surface thereof is convex in the paraxial region, and the fifth lens L5 has a positive refractive power. The object side surface and the image side surface of the fifth lens L5 may also have other arrangements than the above convex-convex arrangement.

The focal length of the camera optical lens is defined as f, and the focal length of the fifth lens L5 is defined as f5. The following condition should be satisfied: 1.22≤f5/f≤4.21. Such limitation for the fifth lens L5 can effectively flatten the light angle of the camera optical lens 10, 20, 30, and 40, thereby reducing tolerance sensitivity. Preferably, the following condition shall be satisfied, 1.95≤f5/f≤3.37.

The central curvature radius of the object side surface of the fifth lens L5 is defined as R9, and the central curvature radius of the image side surface of the fifth lens L5 is defined as R10. The following condition should be satisfied: −0.15≤(R9+R10)/(R9−R10)≤0.08, which specifies the shape of the fifth lens L5. When the condition is satisfied, it facilitates the correction of off-axis aberration for the ultra-thin and wide-angle lenses. Preferably, the following condition shall be satisfied, −0.09≤(R9+R10)/(R9−R10)≤0.06.

The thickness on-axis of the fifth lens L5 is defined as d9, and the total track length of the camera optical lens is defined as TTL. The following condition should be satisfied: 0.08≤d9/TTL≤0.25. Such condition facilitates the ultra-thinness of the camera optical lens. Preferably, the following condition shall be satisfied, 0.12≤d9/TTL≤0.20.

The object side surface of the sixth lens L6 is concave in the paraxial region, the image side surface thereof is also concave in the paraxial region, and the sixth lens L6 has a negative refractive power. The object side surface and the image side surface of the sixth lens L6 may also have other arrangements than the above concave-concave arrangement.

The focal length of the camera optical lens is defined as f, and the focal length of the sixth lens L6 is defined as f6. The following condition should be satisfied: −3.70≤f6/f≤−1.00, which allows a reasonable allocation of focal power of the sixth lens, enabling the system to have better imaging quality and lower sensitivity. Preferably, the following condition shall be satisfied, −2.31≤f6/f≤−1.25.

The central curvature radius of the object side surface of the sixth lens L6 is defined as R11, and the central curvature radius of the image side surface of the sixth lens L6 is defined as R12. The following condition should be satisfied: 0.09≤(R11+R12)/(R11−R12)≤0.43, which specifies the shape of the sixth lens L6. When the condition is satisfied, it facilitates the correction of off-axis aberration for the ultra-thin and wide-angle lenses. Preferably, the following condition shall be satisfied, 0.14≤(R11+R12)/(R11−R12)≤0.34.

The thickness on-axis of the sixth lens L6 is defined as d11, and the total track length of the camera optical lens is defined as TTL. The following condition should be satisfied: 0.02≤d11/TTL≤0.09. Such condition facilitates the ultra-thinness of the camera optical lens. Preferably, the following condition shall be satisfied, 0.04≤d11/TTL≤0.07.

The object side surface of the seventh lens L7 is convex in the paraxial region, the image side surface thereof is also convex in the paraxial region, and the seventh lens L7 has a positive refractive power. The object side surface and the image side surface of the seventh lens L7 may also have other arrangements than the above convex-convex arrangement.

The focal length of the camera optical lens is defined as f, and the focal length of the seventh lens L7 is defined as f7. The following condition should be satisfied: 0.91≤f7/f≤3.00, which allows a reasonable allocation of focal power of the seventh lens, enabling the system to have better imaging quality and lower sensitivity. Preferably, the following condition shall be satisfied, 1.46≤f7/f≤2.40.

The central curvature radius of the object side surface of the seventh lens L7 is defined as R13, and the central curvature radius of the image side surface of the seventh lens L7 is defined as R14. The following condition should be satisfied: −1.91≤(R13+R14)/(R13−R14)≤−0.47, which specifies the shape of the seventh lens L7. When the condition is satisfied, it facilitates the correction of off-axis aberration for the ultra-thin and wide-angle lenses. Preferably, the following condition shall be satisfied, −1.19≤(R13+R14)/(R13−R14)≤−0.59.

The thickness on-axis of the seventh lens L7 is defined as d13, and the total track length of the camera optical lens is defined as TTL. The following condition should be satisfied: 0.06≤d13/TTL≤0.18. Such condition facilitates the ultra-thinness of the camera optical lens. Preferably, the following condition shall be satisfied, 0.09≤d13/TTL≤0.15.

The image height of the camera optical lens is defined as IH, and the total track length of the camera optical lens is defined as TTL. The following condition should be satisfied: TTL/IH≤4.79. Such condition facilitates the ultra-thinness of the camera optical lens. Preferably, the following condition shall be satisfied, TTL/IH≤4.66.

The field of view FOV of the camera optical lens is greater than or equal to 187.05°, achieving wide-angle.

The F-number FNO of the camera optical lens is less than or equal to 1.43, achieving a large aperture and good imaging performance of the camera optical lens.

The camera optical lens of the embodiments of the present disclosure is described with examples below. The symbols used in the examples are shown below. The unit of focal length, distance on-axis, central curvature radius, thickness on-axis, position of inflection point and position of arrest point is millimeter.

TTL: total track length (the distance on-axis from the object side surface of the first lens L1 to the image surface Si), in millimeter;

F-number FNO: ratio of an effective focal length of the camera optical lens to an entrance pupil diameter of the camera optical lens;

Preferably, the lens may also be provided with inflection points and/or arrest points on the object side surface and/or the image side surface to achieve high-quality imaging.

The technical solution of the present disclosure is described in detail with reference to the following four embodiments. Besides, a comparative embodiment is provided as a reference, proving that the technical effects of the present disclosure cannot be achieved while the above conditions are not satisfied.

First Embodiment

Tables 1 and 2 show design data of the camera optical lens 10 according to the first embodiment of the present disclosure.

TABLE 1

| | R | d | | | nd | | vd |
|---|---|---|---|---|---|---|---|
| S1 | ∞ | d0= | −4.322 | | | | |
| R1 | 8.400 | d1= | 0.600 | nd1 | 1.8707 | v1 | 40.73 |
| R2 | 2.713 | d2= | 1.077 | | | | |
| R3 | 0.972 | d3= | 0.418 | nd2 | 1.5346 | v2 | 55.69 |
| R4 | 0.637 | d4= | 0.933 | | | | |
| R5 | 4.260 | d5= | 0.789 | nd3 | 1.6613 | v3 | 20.37 |
| R6 | 7.897 | d6= | 0.795 | | | | |
| R7 | −17.813 | d7= | 1.631 | nd4 | 1.5928 | v4 | 68.35 |
| R8 | −2.000 | d8= | 0.050 | | | | |
| R9 | 3.901 | d9= | 1.870 | nd5 | 1.5444 | v5 | 55.82 |
| R10 | −4.323 | d10= | 0.030 | | | | |
| R11 | −4.976 | d11= | 0.569 | nd6 | 1.6610 | v6 | 20.53 |
| R12 | 2.814 | d12= | 0.313 | | | | |
| R13 | 1.695 | d13= | 1.337 | nd7 | 1.5444 | v7 | 55.82 |
| R14 | −18.197 | d14= | 0.375 | | | | |
| R15 | ∞ | d15= | 0.210 | ndg | 1.5168 | vg | 64.17 |
| R16 | ∞ | d16= | 0.501 | | | | |

Specific meanings of the symbols therein are listed as follow:
S1: aperture;
R: curvature radius of the optical surface, or central curvature radius in case of lens;
R1: central curvature radius of the object side surface of the first lens L1;
R2: central curvature radius of the image side surface of the first lens L1;
R3: central curvature radius of the object side surface of the second lens L2;
R4: central curvature radius of the image side surface of the second lens L2;
R5: central curvature radius of the object side surface of the third lens L3;
R6: central curvature radius of the image side surface of the third lens L3;
R7: central curvature radius of the object side surface of the fourth lens L4;
R8: central curvature radius of the image side surface of the fourth lens L4;
R9: central curvature radius of the object side surface of the fifth lens L5;
R10: central curvature radius of the image side surface of the fifth lens L5;
R11: central curvature radius of the object side surface of the sixth lens L6;
R12: central curvature radius of the image side surface of the sixth lens L6;
R13: central curvature radius of the object side surface of the seventh lens L7;

TABLE 1-continued

| R | d | nd | vd |
|---|---|---|---|

R14: central curvature radius of the image side surface of the seventh lens L7;
R15: central curvature radius of the object side surface of the optical filter GF;
R16: central curvature radius of the image side surface of the optical filter GF;
d: thickness on-axis of the lens, or distance on-axis between the lenses;
d0: distance on-axis from the aperture S1 to the object side surface of the first lens L1;
d1: thickness on-axis of the first lens L1;
d2: distance on-axis from the image side surface of the first lens L1 to the object side surface of the second lens L2;
d3: thickness on-axis of the second lens L2;
d4: distance on-axis from the image side surface of the second lens L2 to the object side surface of the third lens L3;
d5: thickness on-axis of the third lens L3;
d6: distance on-axis from the image side surface of the third lens L3 to the object side surface of the fourth lens L4;
d7: thickness on-axis of the fourth lens L4;
d8: distance on-axis from the image side surface of the fourth lens L4 to the object side surface of the fifth lens L5;
d9: thickness on-axis of the fifth lens L5;
d10: distance on-axis from the image side surface of the fifth lens L5 to the object side surface of the sixth lens L6;
d11: thickness on-axis of the sixth lens L6;
d12: distance on-axis from the image side surface of the sixth lens L6 to the object side surface of the seventh lens L7;
d13: thickness on-axis of the seventh lens L7;
d14: distance on-axis from the image side surface of the seventh lens L7 to the object side surface of the optical filter GF;
d15: thickness on-axis of the optical filter GF;
d16: distance on-axis from the image side surface of the optical filter GF to the image surface Si;
nd: refractive index of d-line (d-line is green light with wavelength of 550 nm);
nd1: refractive index of the first lens L1 for d-line;
nd2: refractive index of the second lens L2 for d-line;
nd3: refractive index of the third lens L3 for d-line;
nd4: refractive index of the fourth lens L4 for d-line;
nd5: refractive index of the fifth lens L5 for d-line;
nd6: refractive index of the sixth lens L6 for d-line;
nd7: refractive index of the seventh lens L7 for d-line;
ndg: refractive index of the optical filter GF for d-line;
vd: Abbe number;
v1: Abee number of the first lens L1;
v2: Abee number of the second lens L2;
v3: Abee number of the third lens L3;
v4: Abee number of the fourth lens L4;
v5: Abee number of the fifth lens L5;
v6: Abee number of the sixth lens L6;
v7: Abee number of the seventh lens L7;
vg: Abee number of the optical filter GF.

Table 2 shows the aspherical data of the lenses in the camera optical lens 10 of the first embodiment of the present disclosure.

TABLE 2

| | Conic Coefficient | Aspherical Coefficient | | | | |
|---|---|---|---|---|---|---|
| | k | A4 | A6 | A8 | A10 | A12 |
| R3 | −8.9513E−01 | −4.6639E−02 | 9.0672E−03 | −8.2764E−02 | 7.0828E−02 | −3.3328E−02 |
| R4 | −4.4076E+00 | 1.5031E+00 | −4.5345E+00 | 1.2392E+01 | −2.7171E+01 | 4.4493E+01 |
| R5 | 5.0035E+00 | 3.1459E−02 | 3.0960E−01 | −1.7884E+00 | 7.1285E+00 | −1.9368E+01 |
| R6 | 4.1729E+01 | 8.6380E−02 | −9.5851E−02 | 5.3221E−01 | −7.9765E−01 | −2.0363E+00 |
| R9 | −2.8324E+00 | 5.8153E−03 | −5.1035E−03 | 4.4242E−03 | −2.4718E−03 | 7.7980E−04 |
| R10 | −8.8275E+01 | −1.8273E−01 | 1.1683E−02 | 1.2179E−01 | −1.0870E−01 | 4.6790E−02 |
| R11 | −6.8590E+01 | −2.0460E−01 | 6.3605E−02 | 7.5844E−02 | −8.5393E−02 | 3.9655E−02 |
| R12 | −2.6820E+01 | −8.0257E−02 | 9.3466E−02 | −6.3761E−02 | 3.0851E−02 | −1.0354E−02 |
| R13 | −6.5675E+00 | −3.7442E−03 | 1.3246E−02 | −1.0010E−02 | 4.1406E−03 | −1.0780E−03 |
| R14 | −2.3323E+01 | 3.0671E−02 | −1.0930E−02 | 7.3475E−03 | −4.7954E−03 | 1.7247E−03 |

| | Conic Coefficient | Aspherical Coefficient | | | | |
|---|---|---|---|---|---|---|
| | k | A14 | A16 | A18 | A20 | A22 |
| R3 | −8.9513E−01 | 1.1412E−02 | −3.0960E−03 | 6.3966E−04 | −9.1478E−05 | 7.9268E−06 |
| R4 | −4.4076E+00 | −5.3657E+01 | 4.7652E+01 | −3.1149E+01 | 1.4888E+01 | −5.1160E+00 |
| R5 | 5.0035E+00 | 3.7201E+01 | −5.1528E+01 | 5.1914E+01 | −3.7998E+01 | 1.9960E+01 |
| R6 | 4.1729E+01 | 1.2643E+01 | −2.8318E+01 | 3.5382E+01 | −2.5905E+01 | 1.0404E+01 |
| R9 | −2.8324E+00 | −9.1532E−05 | −1.7268E−05 | 6.0590E−06 | −4.8493E−07 | |
| R10 | −8.8275E+01 | −1.1543E−02 | 1.6396E−03 | −1.2204E−04 | 3.5479E−06 | |
| R11 | −6.8590E+01 | −1.0342E−02 | 1.5659E−03 | −1.2738E−04 | 4.2486E−06 | |

TABLE 2-continued

| | | | | | |
|---|---|---|---|---|---|
| R12 | −2.6820E+01 | 2.2913E−03 | −3.1575E−04 | 2.4464E−05 | −8.1247E−07 |
| R13 | −6.5675E+00 | 1.8744E−04 | −2.1502E−05 | 1.4509E−06 | −4.2554E−08 |
| R14 | −2.3323E+01 | −3.4262E−04 | 3.7944E−05 | −2.1991E−06 | 5.2035E−08 |

| | Conic Coefficient | Aspherical Coefficient | | | |
|---|---|---|---|---|---|
| | k | A24 | A26 | A28 | A30 |
| R3 | −8.9513E−01 | −2.9919E−07 | −5.7482E−09 | 6.2854E−10 | 0.0000E+00 |
| R4 | −4.4076E+00 | 1.2239E+00 | −1.9207E−01 | 1.7591E−02 | −7.0092E−04 |
| R5 | 5.0035E+00 | −7.3191E+00 | 1.7760E+00 | −2.5587E−01 | 1.6545E−02 |
| R6 | 4.1729E+01 | −1.7719E+00 | 0.0000E+00 | 0.0000E+00 | 0.0000E+00 |

For convenience, the aspherical surfaces of the lenses conform to the following formula (1). However, the present disclosure is not limited to the aspherics defined in a polynomial form represented by the formula (1).

$$z = (cr^2)/\{1+[1-(k+1)(c^2r^2)]^{1/2}\} + A4r^4 + A6r^6 + A8r^8 + A10r^{10} + A12r^{12} + A14r^{14} + A16r^{16} + A18r^{18} + A20r^{20} + A22r^{22} + A24r^{24} + A26r^{26} + A28r^{28} + A30r^{30} \tag{1}$$

where K denotes a conic coefficient, A4, A6, A8, A10, A12, A14, A16, A18, A20, A22, A24, A26, A28 and A30 denote aspherical coefficients, c denotes a curvature at the center of the optical surface, r denotes a vertical distance between a point on the aspherical curve and the optical axis, z denotes a depth of the aspherical surface (the vertical distance between a point on the aspherical surface with a distance of r from the optical axis and a tangent plane tangential to the vertex on the optical axis of the aspherical surface).

Tables 3 and 4 show design data of the inflection points and arrest points of the lenses in the camera optical lens 10 of the first embodiment of the present disclosure. In the tables 3 and 4, P1R1 and P1R2 respectively represent the object side surface and image side surface of the first lens L1, P2R1 and P2R2 respectively represent the object side surface and image side surface of the second lens L2, P3R1 and P3R2 respectively represent the object side surface and image side surface of the third lens L3, P4R1 and P4R2 respectively represent the object side surface and image side surface of the fourth lens L4, P5R1 and P5R2 respectively represent the object side surface and image side surface of the fifth lens L5, P6R1 and P6R2 respectively represent the object side surface and image side surface of the sixth lens L6, P7R1 and P7R2 respectively represent the object side surface and image side surface of the seventh lens L7. The data in the column named "inflexion point position" are the vertical distances from the inflexion points arranged on the surface of each lens to the optic axis of the camera optical lens 10. The data in the column named "arrest point position" are the vertical distances from the arrest points arranged on the surface of each lens to the optic axis of the camera optical lens 10.

TABLE 3

| | Amount of Inflexion points | 1st Position of Inflexion points | 2nd Position of Inflexion points | 3rd Position of Inflexion points | 4th Position of Inflexion points | 5th Position of Inflexion points |
|---|---|---|---|---|---|---|
| P2R1 | 2 | 0.935 | 1.965 | / | / | / |
| P2R2 | 2 | 1.035 | 1.485 | / | / | / |
| P3R1 | 1 | 1.455 | / | / | / | / |
| P5R1 | 1 | 1.745 | / | / | / | / |
| P5R2 | 1 | 1.865 | / | / | / | / |
| P6R1 | 1 | 1.825 | / | / | / | / |
| P6R2 | 5 | 0.605 | 0.775 | 1.815 | 2.245 | 2.425 |
| P7R1 | 2 | 2.055 | 2.585 | / | / | / |
| P7R2 | 3 | 0.415 | 2.045 | 2.705 | / | / |

TABLE 4

| | Amount of Arrest points | 1st Position of Arrest points | 2nd Position of Arrest points |
|---|---|---|---|
| P5R2 | 1 | 2.185 | |
| P6R1 | 1 | 2.195 | |
| P7R2 | 2 | 0.745 | 2.365 |

Figure 2:
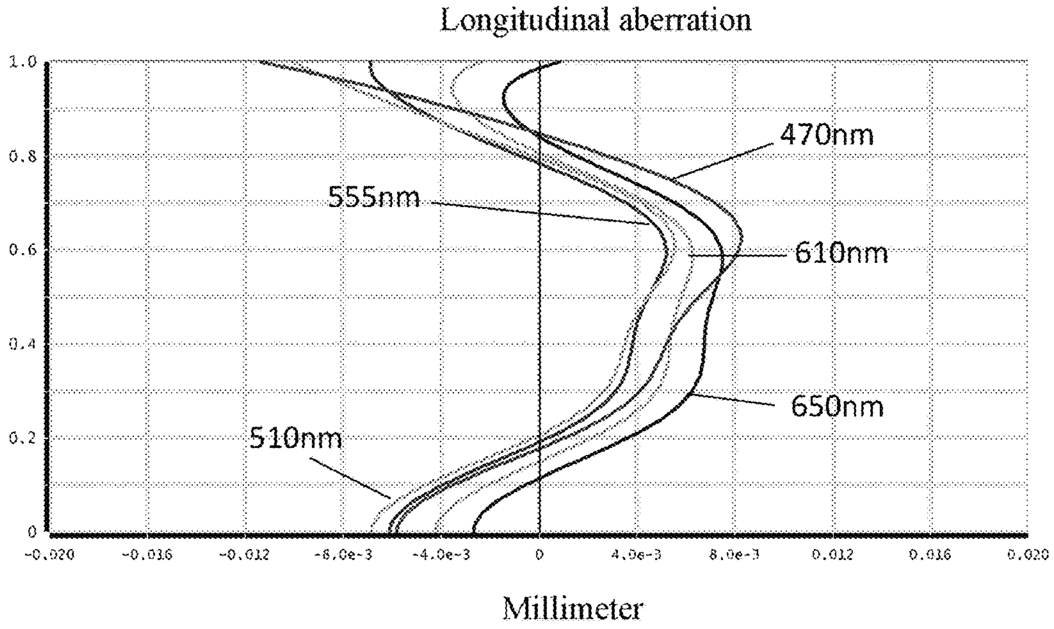
FIG. 2 illustrates the longitudinal aberration of the camera optical lens shown in FIG. 1.
Figure 3:
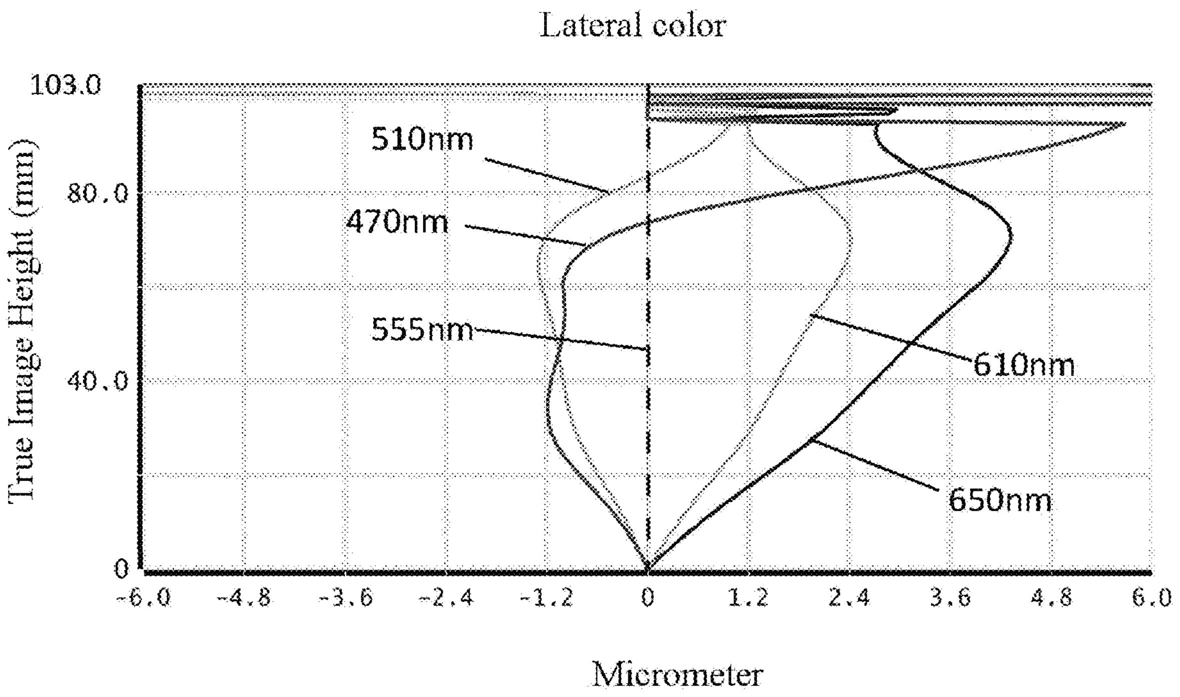
FIG. 3 illustrates the lateral color of the camera optical lens shown in FIG. 1.
Figure 4:
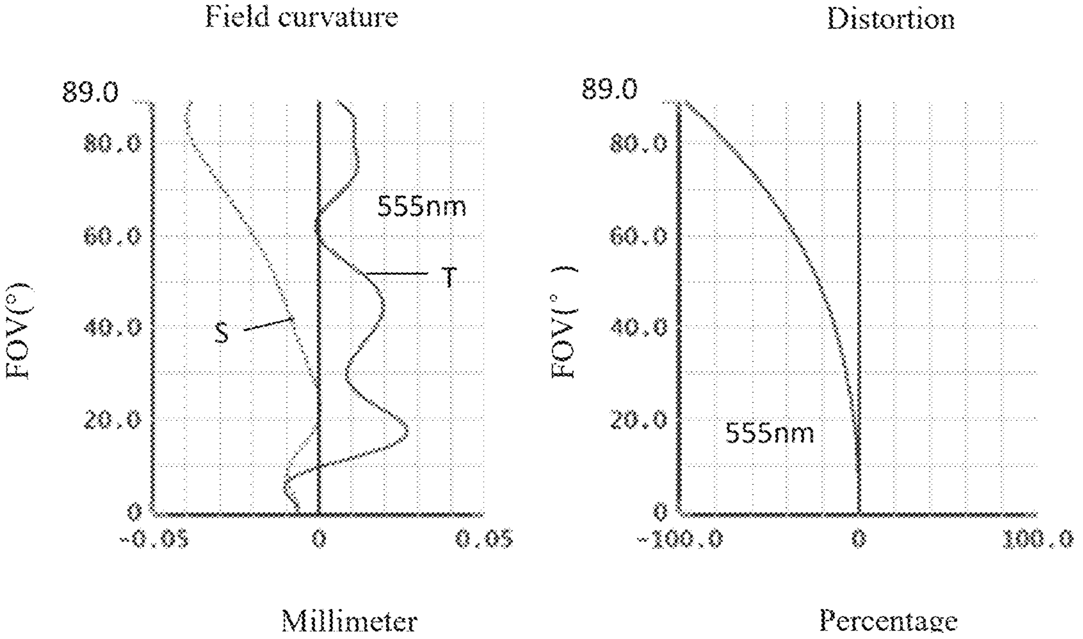
FIG. 4 presents a schematic diagram of the field curvature and distortion of the camera optical lens shown in FIG. 1.

FIG. 2 and FIG. 3 show the longitudinal aberration and lateral color after light with a wavelength respectively of 650 nm, 610 nm, 555 nm, 510 nm and 470 nm passes the camera optical lens 10 in the first embodiment. FIG. 4 shows the field curvature and distortion after light with a wavelength of 555 nm passes the camera optical lens 10 in the first embodiment, where the field curvature S in FIG. 4 denotes a field curvature in the sagittal direction, and T denotes a field curvature in the meridian direction.

In the present embodiment, the entrance pupil diameter (ENPD) of the camera optical lens 10 is 1.016 mm, the IH is 2.733 mm, and the field of view (FOV) in the diagonal direction is 206.00°. The camera optical lens 10 meets the design requirements of large aperture, wide angle and ultra-thinness, and its on-axis and off-axis chromatic aberrations are fully corrected, and it has excellent optical characteristics.

Second Embodiment

The meanings of the symbols of the second embodiment are the same as those of the first embodiment.

Figure 5:
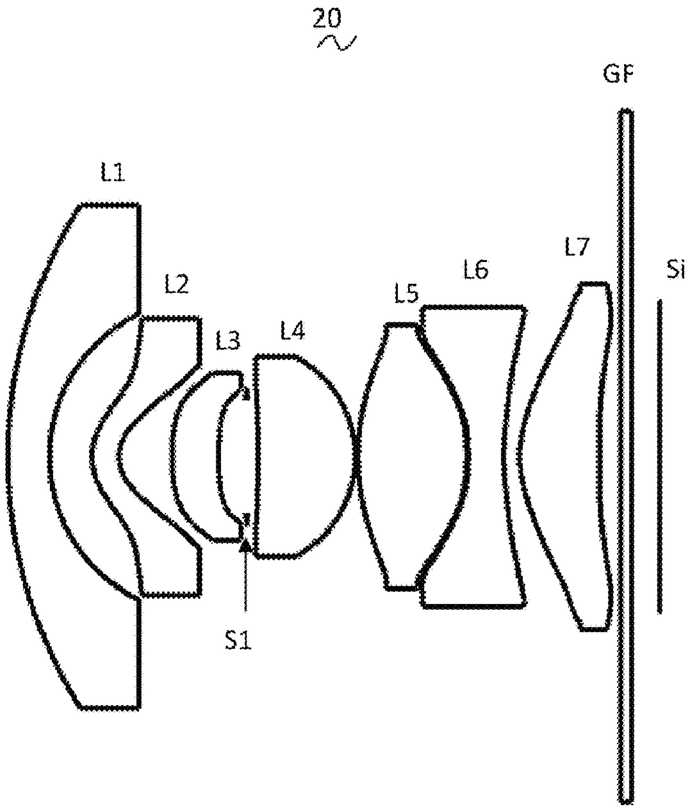
FIG. 5 is a schematic structural diagram of a camera optical lens according to a second embodiment of the present disclosure.

FIG. 5 shows a camera optical lens 20 according to a second embodiment of the present disclosure.

Tables 5 and 6 show design data of the camera optical lens 20 according to the second embodiment of the present disclosure.

TABLE 5

| | R | | d | | nd | | vd |
|---|---|---|---|---|---|---|---|
| S1 | ∞ | d0= | −4.161 | | | | |
| R1 | 8.225 | d1= | 0.713 | nd1 | 1.8707 | v1 | 40.73 |
| R2 | 2.758 | d2= | 0.743 | | | | |
| R3 | 0.980 | d3= | 0.470 | nd2 | 1.5346 | v2 | 55.69 |
| R4 | 0.655 | d4= | 0.932 | | | | |
| R5 | 3.970 | d5= | 0.812 | nd3 | 1.6613 | v3 | 20.37 |
| R6 | 7.729 | d6= | 0.694 | | | | |
| R7 | −18.009 | d7= | 1.682 | nd4 | 1.5928 | v4 | 68.35 |
| R8 | −1.981 | d8= | 0.050 | | | | |
| R9 | 3.981 | d9= | 1.893 | nd5 | 1.5444 | v5 | 55.82 |
| R10 | −4.628 | d10= | 0.030 | | | | |
| R11 | −4.762 | d11= | 0.617 | nd6 | 1.6610 | v6 | 20.53 |
| R12 | 2.885 | d12= | 0.284 | | | | |

TABLE 5-continued

| | R | | d | | nd | | vd |
|---|---|---|---|---|---|---|---|
| R13 | 1.764 | d13= | 1.393 | nd7 | 1.5444 | v7 | 55.82 |
| R14 | −76.588 | d14= | 0.356 | | | | |
| R15 | ∞ | d15= | 0.210 | ndg | 1.5168 | vg | 64.17 |
| R16 | ∞ | d16= | 0.483 | | | | |

Table 6 shows the aspherical data of the lenses in the camera optical lens 20 of the second embodiment of the present disclosure.

TABLE 6

| | Conic Coefficient | Aspherical Coefficient | | | | |
|---|---|---|---|---|---|---|
| | k | A4 | A6 | A8 | A10 | A12 |
| R3 | −8.9485E−01 | −4.7254E−02 | 8.9436E−03 | −8.2780E−02 | 7.0829E−02 | −3.3328E−02 |
| R4 | −4.4956E+00 | 1.5029E+00 | −4.5326E+00 | 1.2392E+01 | −2.7171E+01 | 4.4493E+01 |
| R5 | 4.8705E+00 | 3.1389E−02 | 3.0861E−01 | −1.7889E+00 | 7.1284E+00 | −1.9368E+01 |
| R6 | 4.0948E+01 | 8.2469E−02 | −9.4967E−02 | 5.3154E−01 | −7.9757E−01 | −2.0362E+00 |
| R9 | −3.0507E+00 | 5.5889E−03 | −5.1501E−03 | 4.4303E−03 | −2.4707E−03 | 7.7978E−04 |
| R10 | −9.0465E+01 | −1.8348E−01 | 1.1623E−02 | 1.2178E−01 | −1.0870E−01 | 4.6790E−02 |
| R11 | −6.7023E+01 | −2.0450E−01 | 6.3613E−02 | 7.5844E−02 | −8.5394E−02 | 3.9655E−02 |
| R12 | −2.5068E+01 | −8.0807E−02 | 9.3484E−02 | −6.3750E−02 | 3.0852E−02 | −1.0355E−02 |
| R13 | −6.0976E+00 | −3.5269E−03 | 1.3248E−02 | −1.0018E−02 | 4.1406E−03 | −1.0779E−03 |
| R14 | −3.8191E+02 | 3.0412E−02 | −1.0927E−02 | 7.3455E−03 | −4.7957E−03 | 1.7248E−03 |

| | Conic Coefficient | Aspherical Coefficient | | | | |
|---|---|---|---|---|---|---|
| | k | A14 | A16 | A18 | A20 | A22 |
| R3 | −8.9485E−01 | 1.1412E−02 | −3.0960E−03 | 6.3966E−04 | −9.1478E−05 | 7.9267E−06 |
| R4 | −4.4956E+00 | −5.3657E+01 | 4.7652E+01 | −3.1149E+01 | 1.4888E+01 | −5.1160E+00 |
| R5 | 4.8705E+00 | 3.7201E+01 | −5.1528E+01 | 5.1914E+01 | −3.7998E+01 | 1.9960E+01 |
| R6 | 4.0948E+01 | 1.2643E+01 | −2.8318E+01 | 3.5380E+01 | −2.5905E+01 | 1.0403E+01 |
| R9 | −3.0507E+00 | −9.1535E−05 | −1.7268E−05 | 6.0592E−06 | −4.8462E−07 | |
| R10 | −9.0465E+01 | −1.1543E−02 | 1.6396E−03 | −1.2204E−04 | 3.5484E−06 | |
| R11 | −6.7023E+01 | −1.0342E−02 | 1.5659E−03 | −1.2738E−04 | 4.2490E−06 | |
| R12 | −2.5068E+01 | 2.2914E−03 | −3.1575E−04 | 2.4464E−05 | −8.1250E−07 | |
| R13 | −6.0976E+00 | 1.8744E−04 | −2.1502E−05 | 1.4510E−06 | −4.2544E−08 | |
| R14 | −3.8191E+02 | −3.4262E−04 | 3.7944E−05 | −2.1991E−06 | 5.2027E−08 | |

| | Conic Coefficient | Aspherical Coefficient | | | |
|---|---|---|---|---|---|
| | k | A24 | A26 | A28 | A30 |
| R3 | −8.9485E−01 | −2.9918E−07 | −5.7467E−09 | 6.2845E−10 | −3.6839E−14 |
| R4 | −4.4956E+00 | 1.2239E+00 | −1.9207E−01 | 1.7591E−02 | −7.0092E−04 |
| R5 | 4.8705E+00 | −7.3191E+00 | 1.7760E+00 | −2.5587E−01 | 1.6545E−02 |
| R6 | 4.0948E+01 | −1.7720E+00 | 8.3207E−06 | 7.9064E−05 | 1.4473E−04 |

Tables 7 and 8 show design data of the inflection points and arrest points of the lenses in the camera optical lens 20 of the second embodiment of the present disclosure.

TABLE 7

| | Amount of Inflexion points | 1st Position of Inflexion points | 2nd Position of Inflexion points | 3rd Position of Inflexion points | 4th Position of Inflexion points |
|---|---|---|---|---|---|
| P2R1 | 3 | 0.935 | 2.055 | 2.215 | / |
| P2R2 | 2 | 1.055 | 1.465 | / | / |
| P3R1 | 1 | 1.425 | / | / | / |
| P5R1 | 1 | 1.735 | / | / | / |
| P5R2 | 1 | 1.885 | / | / | / |
| P6R1 | 1 | 1.825 | / | / | / |
| P6R2 | 4 | 0.645 | 0.745 | 1.845 | 2.195 |

TABLE 7-continued

| | Amount of Inflexion points | 1st Position of Inflexion points | 2nd Position of Inflexion points | 3rd Position of Inflexion points | 4th Position of Inflexion points |
|---|---|---|---|---|---|
| P7R1 | 1 | 2.065 | / | / | / |
| P7R2 | 2 | 0.195 | 2.055 | / | / |

TABLE 8

| | Amount of Arrest points | 1st Position of Arrest points |
|---|---|---|
| P7R2 | 1 | 0.335 |

Figure 6:
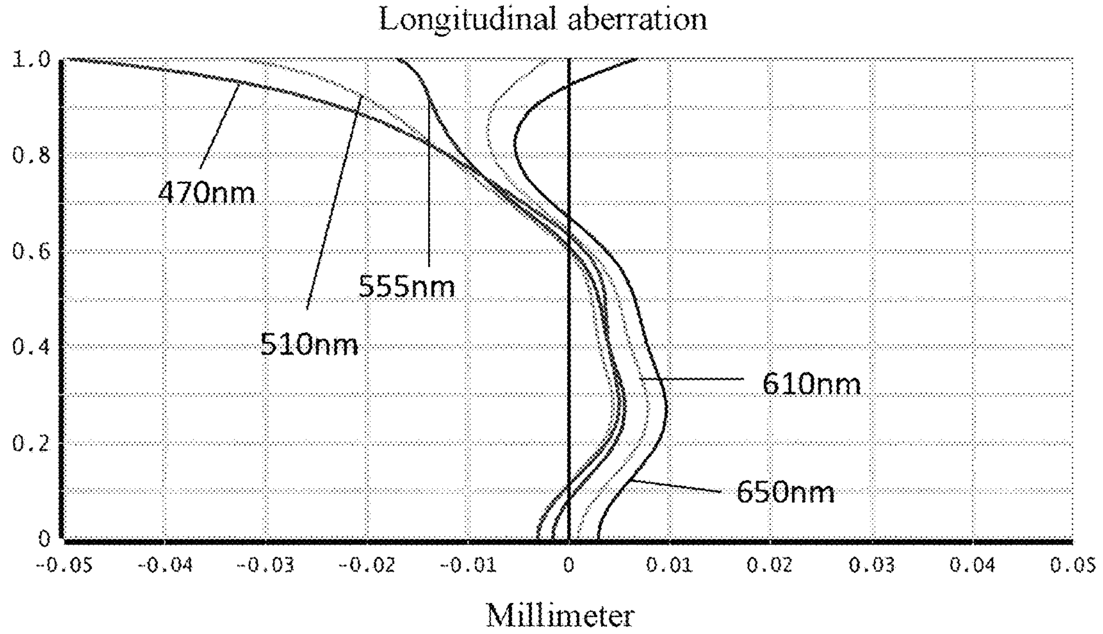
FIG. 6 illustrates the longitudinal aberration of the camera optical lens shown in FIG. 5.
Figure 7:
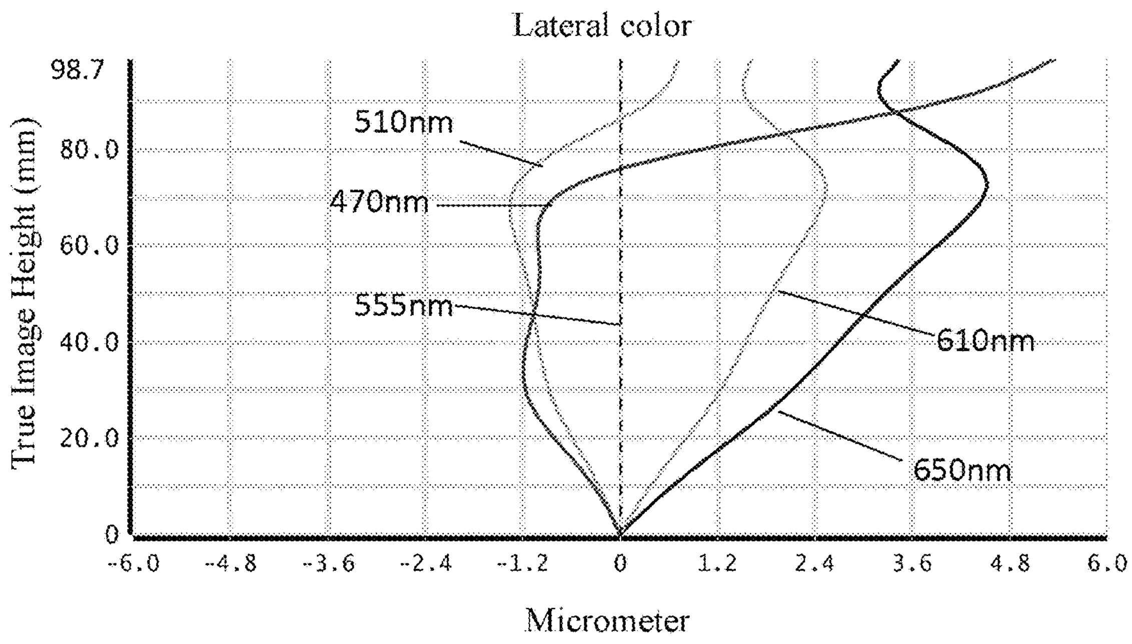
FIG. 7 illustrates the lateral color of the camera optical lens shown in FIG. 5.
Figure 8:
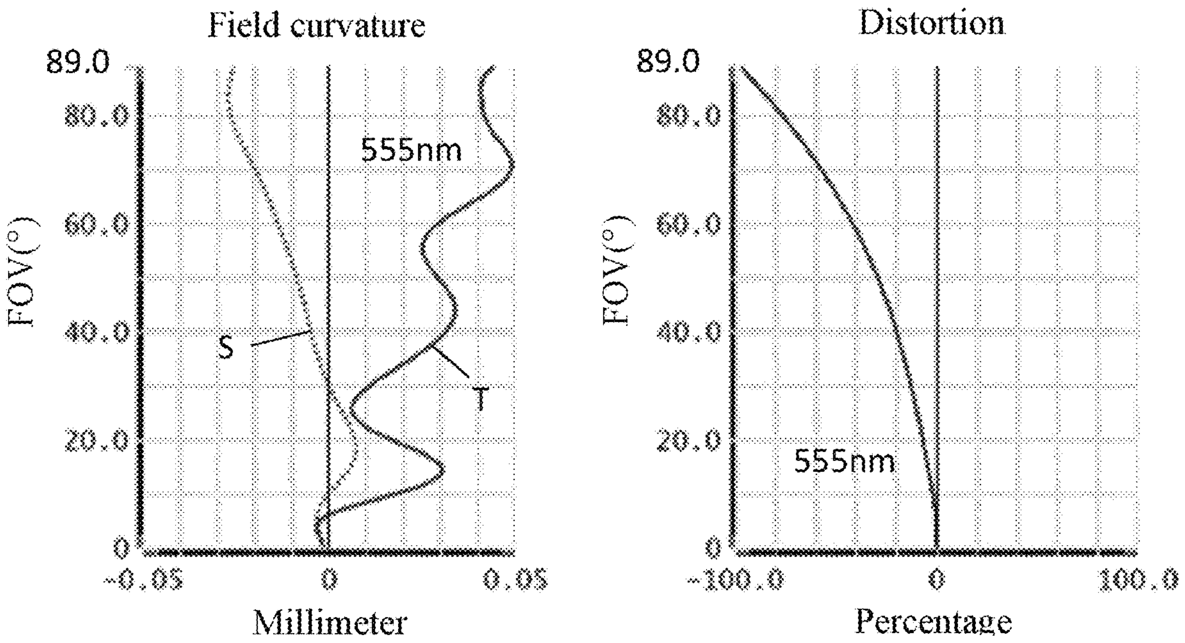
FIG. 8 presents a schematic diagram of the field curvature and distortion of the camera optical lens shown in FIG. 5.

FIG. 6 and FIG. 7 show the longitudinal aberration and lateral color after light with a wavelength respectively of 650 nm, 610 nm, 555 nm, 510 nm and 470 nm passes the camera optical lens 20 in the second embodiment. FIG. 8 shows the field curvature and distortion after light with a wavelength of 555 nm passes the camera optical lens 20 in the second embodiment, where the field curvature S in FIG. 8 denotes a field curvature in the sagittal direction, and T denotes a field curvature in the meridian direction.

In the present embodiment, the entrance pupil diameter (ENPD) of the camera optical lens 20 is 1.221 mm, the IH is 2.697 mm, and the field of view (FOV) in the diagonal direction is 197.38°. The camera optical lens 20 meets the design requirements of large aperture, wide angle and ultra-thinness, and its on-axis and off-axis chromatic aberrations are fully corrected, and it has excellent optical characteristics.

Third Embodiment

The meanings of the symbols of the third embodiment are the same as those of the first embodiment.

Figure 9:
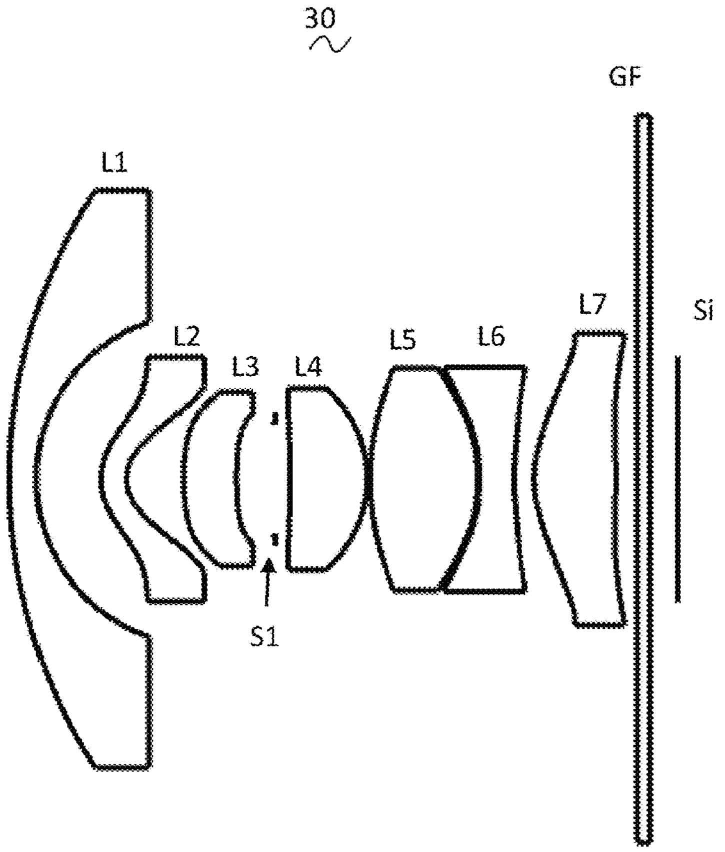
FIG. 9 is a schematic structural diagram of a camera optical lens according to a third embodiment of the present disclosure.

FIG. 9 shows a camera optical lens 30 according to a third embodiment of the present disclosure.

Tables 9 and 10 show design data of the camera optical lens 30 according to the third embodiment of the present disclosure.

TABLE 9

| | R | d | | nd | | vd | |
|---|---|---|---|---|---|---|---|
| S1 | ∞ | d0= | −4.418 | | | | |
| R1 | 8.684 | d1= | 0.441 | nd1 | 1.7170 | v1 | 47.92 |
| R2 | 2.731 | d2= | 1.073 | | | | |
| R3 | 0.983 | d3= | 0.433 | nd2 | 1.5346 | v2 | 55.69 |
| R4 | 0.623 | d4= | 0.946 | | | | |
| R5 | 4.260 | d5= | 0.888 | nd3 | 1.6613 | v3 | 20.37 |
| R6 | 7.652 | d6= | 0.889 | | | | |
| R7 | −18.867 | d7= | 1.272 | nd4 | 1.5928 | v4 | 68.35 |
| R8 | −1.978 | d8= | 0.050 | | | | |
| R9 | 4.117 | d9= | 1.793 | nd5 | 1.5444 | v5 | 55.82 |
| R10 | −3.716 | d10= | 0.030 | | | | |
| R11 | −4.481 | d11= | 0.574 | nd6 | 1.6610 | v6 | 20.53 |
| R12 | 3.134 | d12= | 0.341 | | | | |
| R13 | 1.721 | d13= | 1.351 | nd7 | 1.5444 | v7 | 55.82 |
| R14 | −9.894 | d14= | 0.349 | | | | |
| R15 | ∞ | d15= | 0.210 | ndg | 1.5168 | vg | 64.17 |
| R16 | ∞ | d16= | 0.479 | | | | |

Table 10 shows the aspherical data of the lenses in the camera optical lens 30 of the third embodiment of the present disclosure.

TABLE 10

| | Conic Coefficient | Aspherical Coefficient | | | | |
|---|---|---|---|---|---|---|
| | k | A4 | A6 | A8 | A10 | A12 |
| R3 | −8.9947E−01 | −4.7723E−02 | 8.9086E−03 | −8.2779E−02 | 7.0826E−02 | −3.3328E−02 |
| R4 | −4.1855E+00 | 1.5080E+00 | −4.5377E+00 | 1.2391E+01 | −2.7171E+01 | 4.4493E+01 |
| R5 | 4.7409E+00 | 2.7970E−02 | 3.0847E−01 | −1.7884E+00 | 7.1283E+00 | −1.9368E+01 |
| R6 | 4.2126E+01 | 7.9978E−02 | −1.0037E−01 | 5.3166E−01 | −7.9482E−01 | −2.0363E+00 |
| R9 | −2.7711E+00 | 5.3794E−03 | −5.0924E−03 | 4.4442E−03 | −2.4742E−03 | 7.7941E−04 |
| R10 | −7.6906E+01 | −1.8357E−01 | 1.1900E−02 | 1.2182E−01 | −1.0870E−01 | 4.6789E−02 |
| R11 | −8.7391E+01 | −2.0318E−01 | 6.3586E−02 | 7.5864E−02 | −8.5385E−02 | 3.9655E−02 |
| R12 | −3.2110E+01 | −8.1122E−02 | 9.3477E−02 | −6.3756E−02 | 3.0853E−02 | −1.0356E−02 |
| R13 | −6.4620E+00 | −4.6333E−03 | 1.3046E−02 | −1.0023E−02 | 4.1351E−03 | −1.0781E−03 |
| R14 | −6.4510E+01 | 3.3502E−02 | −1.1046E−02 | 7.3529E−03 | −4.7946E−03 | 1.7245E−03 |

| | Conic Coefficient | Aspherical Coefficient | | | | |
|---|---|---|---|---|---|---|
| | k | A14 | A16 | A18 | A20 | A22 |
| R3 | −8.9947E−01 | 1.1412E−02 | −3.0959E−03 | 6.3968E−04 | −9.1477E−05 | 7.9268E−06 |
| R4 | −4.1855E+00 | −5.3657E+01 | 4.7652E+01 | −3.1150E+01 | 1.4888E+01 | −5.1160E+00 |
| R5 | 4.7409E+00 | 3.7201E+01 | −5.1528E+01 | 5.1914E+01 | −3.7998E+01 | 1.9960E+01 |
| R6 | 4.2126E+01 | 1.2641E+01 | −2.8319E+01 | 3.5380E+01 | −2.5906E+01 | 1.0404E+01 |
| R9 | −2.7711E+00 | −9.2079E−05 | −1.7119E−05 | 6.0586E−06 | −4.6996E−07 | −9.2079E−05 |
| R10 | −7.6906E+01 | −1.1543E−02 | 1.6396E−03 | −1.2203E−04 | 3.5525E−06 | −1.1543E−02 |
| R11 | −8.7391E+01 | −1.0342E−02 | 1.5658E−03 | −1.2742E−04 | 4.2465E−06 | −1.0342E−02 |
| R12 | −3.2110E+01 | 2.2912E−03 | −3.1577E−04 | 2.4468E−05 | −8.1331E−07 | 2.2912E−03 |
| R13 | −6.4620E+00 | 1.8733E−04 | −2.1503E−05 | 1.4516E−06 | −4.2653E−08 | 1.8733E−04 |
| R14 | −6.4510E+01 | −3.4263E−04 | 3.7942E−05 | −2.1969E−06 | 5.2280E−08 | −3.4263E−04 |

| | Conic Coefficient | Aspherical Coefficient | | | |
|---|---|---|---|---|---|
| | k | A24 | A26 | A28 | A30 |
| R3 | −8.9947E−01 | −2.9920E−07 | −5.7769E−09 | 6.2442E−10 | 2.8995E−13 |
| R4 | −4.1855E+00 | 1.2239E+00 | −1.9207E−01 | 1.7591E−02 | −7.0092E−04 |

TABLE 10-continued

| | | | | | |
|---|---|---|---|---|---|
| R5 | 4.7409E+00 | −7.3191E+00 | 1.7760E+00 | −2.5587E−01 | 1.6545E−02 |
| R6 | 4.2126E+01 | −1.7720E+00 | 4.5202E−04 | 3.3865E−04 | 2.7292E−05 |

Tables 11 and 12 show design data of the inflection points and arrest points of the lenses in the camera optical lens 30 of the third embodiment of the present disclosure.

TABLE 11

| | Amount of Inflexion points | 1st Position of Inflexion points | 2nd Position of Inflexion points | 3rd Position of Inflexion points |
|---|---|---|---|---|
| P2R1 | 1 | 0.925 | / | / |
| P2R2 | 2 | 1.015 | 1.535 | / |
| P3R1 | 1 | 1.395 | / | / |
| P5R2 | 1 | 1.815 | / | / |
| P6R1 | 1 | 1.845 | / | / |
| P6R2 | 3 | 0.555 | 0.825 | 1.695 |
| P7R1 | 1 | 1.625 | / | / |
| P7R2 | 1 | 0.495 | / | / |

TABLE 12

| | Amount of Arrest points | 1st Position of Arrest points |
|---|---|---|
| P7R2 | 1 | 0.905 |

Figure 10:
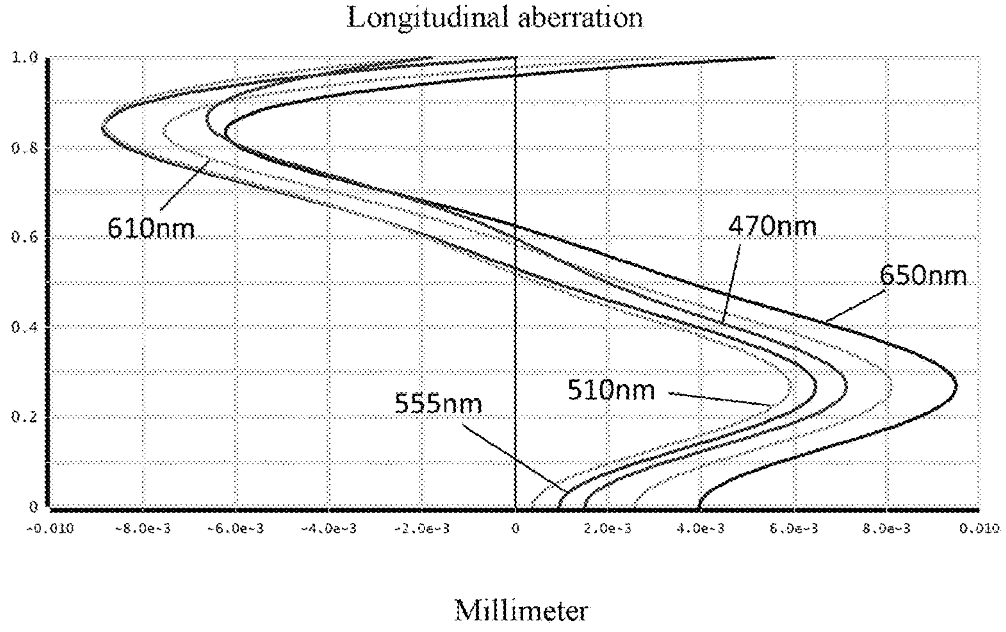
FIG. 10 illustrates the longitudinal aberration of the camera optical lens shown in FIG. 9.
Figure 11:
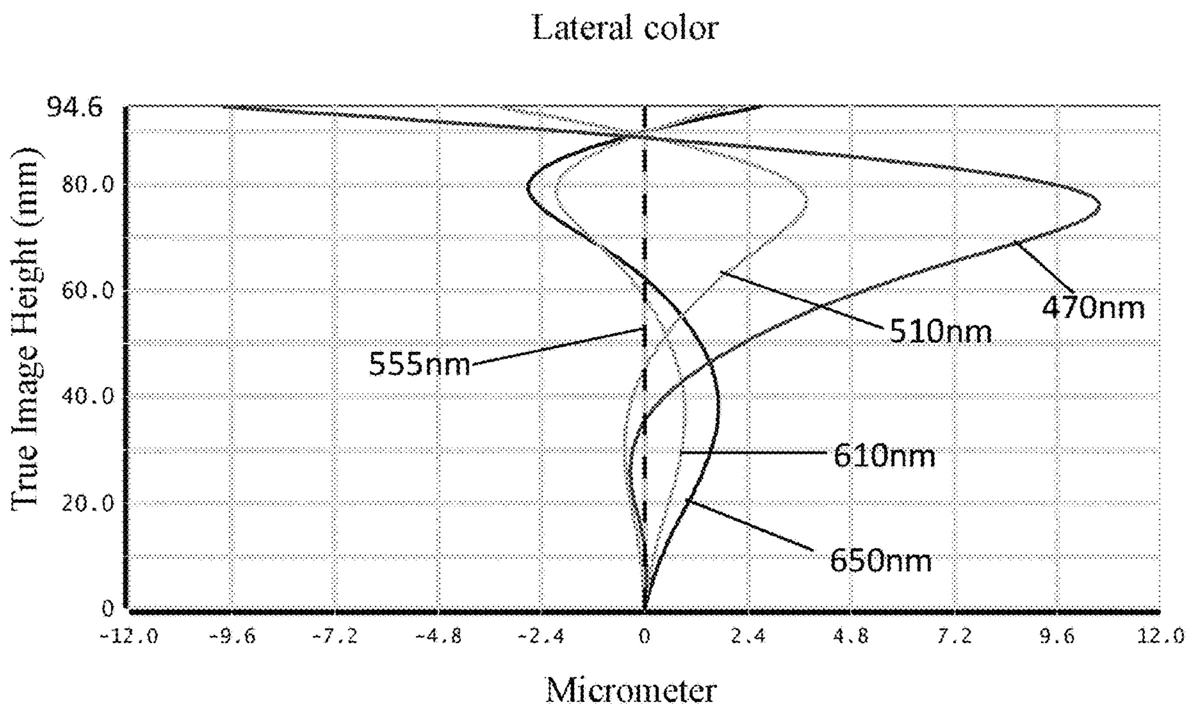
FIG. 11 illustrates the lateral color of the camera optical lens shown in FIG. 9.
Figure 12:
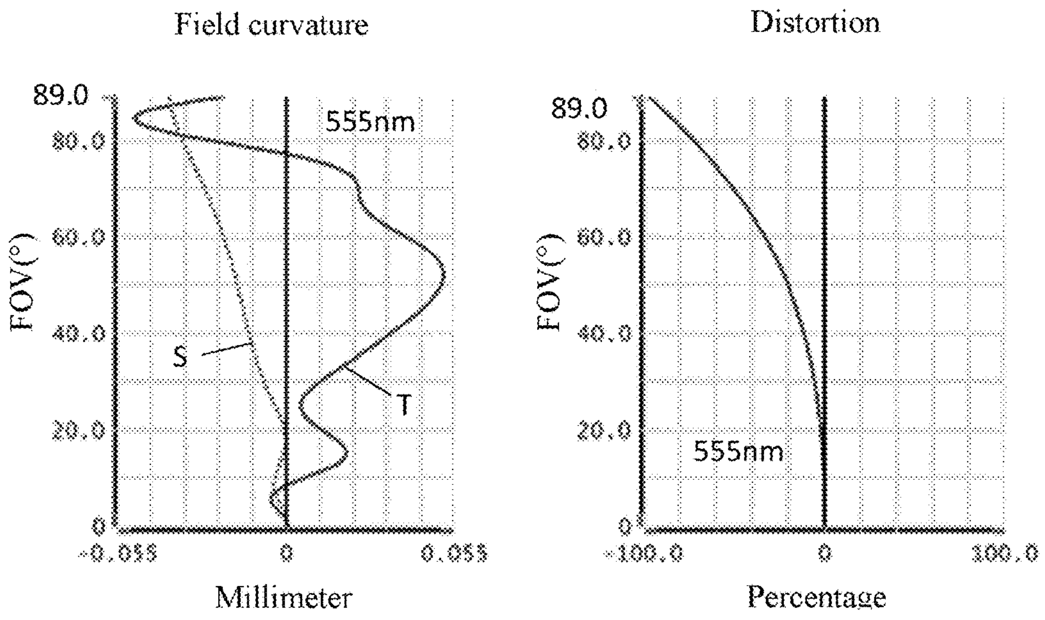
FIG. 12 presents a schematic diagram of the field curvature and distortion of the camera optical lens shown in FIG. 9.

FIG. 10 and FIG. 11 show the longitudinal aberration and lateral color after light with a wavelength respectively of 650 nm, 610 nm, 555 nm, 510 nm and 470 nm passes the camera optical lens 30 in the third embodiment. FIG. 12 shows the field curvature and distortion after light with a wavelength of 555 nm passes the camera optical lens 30 in the third embodiment, where the field curvature S in FIG. 12 denotes a field curvature in the sagittal direction, and T denotes a field curvature in the meridian direction.

In the present embodiment, the entrance pupil diameter (ENPD) of the camera optical lens 30 is 1.0138 mm, the IH is 2.735 mm, and the field of view (FOV) in the diagonal direction is 189.23°. The camera optical lens 30 meets the design requirements of large aperture, wide angle and ultra-thinness, and its on-axis and off-axis chromatic aberrations are fully corrected, and it has excellent optical characteristics.

Fourth Embodiment

The meanings of the symbols of the fourth embodiment are the same as those of the first embodiment.

Figure 13:
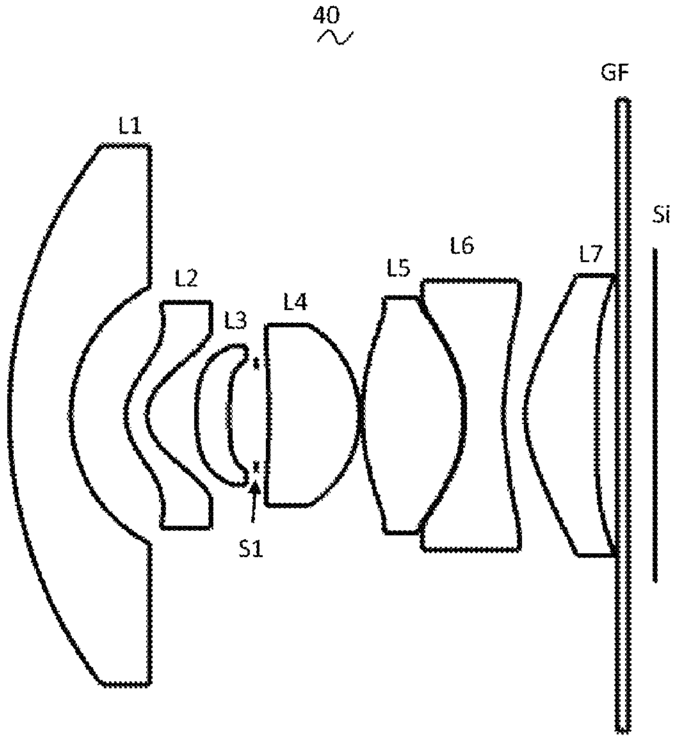
FIG. 13 is a schematic structural diagram of a camera optical lens according to a fourth embodiment of the present disclosure.

FIG. 13 shows a camera optical lens 40 according to a fourth embodiment of the present disclosure.

Tables 13 and 14 show design data of the camera optical lens 40 according to the fourth embodiment of the present disclosure.

TABLE 13

| | R | d | | nd | | vd | |
|---|---|---|---|---|---|---|---|
| S1 | ∞ | d0= | −4.716 | | | | |
| R1 | 8.324 | d1= | 1.175 | nd1 | 2.0509 | v1 | 26.94 |
| R2 | 2.731 | d2= | 1.048 | | | | |
| R3 | 0.992 | d3= | 0.405 | nd2 | 1.5346 | v2 | 55.69 |
| R4 | 0.635 | d4= | 0.946 | | | | |
| R5 | 4.037 | d5= | 0.625 | nd3 | 1.6613 | v3 | 20.37 |
| R6 | 7.301 | d6= | 0.752 | | | | |
| R7 | −18.314 | d7= | 1.736 | nd4 | 1.5928 | v4 | 68.35 |
| R8 | −2.008 | d8= | 0.050 | | | | |
| R9 | 4.000 | d9= | 1.926 | nd5 | 1.5444 | v5 | 55.82 |
| R10 | −4.260 | d10= | 0.030 | | | | |
| R11 | −4.993 | d11= | 0.741 | nd6 | 1.6610 | v6 | 20.53 |
| R12 | 2.776 | d12= | 0.421 | | | | |
| R13 | 1.724 | d13= | 1.370 | nd7 | 1.5444 | v7 | 55.82 |
| R14 | −15.670 | d14= | 0.389 | | | | |
| R15 | ∞ | d15= | 0.210 | ndg | 1.5168 | vg | 64.17 |
| R16 | ∞ | d16= | 0.504 | | | | |

Table 14 shows the aspherical data of the lenses in the camera optical lens 40 of the fourth embodiment of the present disclosure.

TABLE 14

| | Conic Coefficient | Aspherical Coefficient | | | | |
|---|---|---|---|---|---|---|
| | k | A4 | A6 | A8 | A10 | A12 |
| R3 | −9.0280E−01 | −5.0001E−02 | 8.6747E−03 | −8.2771E−02 | 7.0835E−02 | −3.3327E−02 |
| R4 | −5.3717E+00 | 1.4977E+00 | −4.5353E+00 | 1.2391E+01 | −2.7171E+01 | 4.4493E+01 |
| R5 | 6.3042E+00 | 3.9670E−02 | 3.1148E−01 | −1.7855E+00 | 7.1301E+00 | −1.9367E+01 |
| R6 | 4.3134E+01 | 8.5078E−02 | −9.3124E−02 | 5.3911E−01 | −7.9077E−01 | −2.0310E+00 |
| R9 | −3.3371E+00 | 5.2817E−03 | −5.2037E−03 | 4.4250E−03 | −2.4759E−03 | 7.7914E−04 |
| R10 | −1.6355E+02 | −1.8373E−01 | 1.1619E−02 | 1.2178E−01 | −1.0870E−01 | 4.6789E−02 |
| R11 | −6.6215E+01 | −2.0435E−01 | 6.3557E−02 | 7.5845E−02 | −8.5393E−02 | 3.9655E−02 |
| R12 | −2.2093E+01 | −8.1067E−02 | 9.3472E−02 | −6.3765E−02 | 3.0850E−02 | −1.0355E−02 |
| R13 | −5.9602E+00 | −4.0485E−03 | 1.3198E−02 | −1.0005E−02 | 4.1426E−03 | −1.0777E−03 |
| R14 | −1.4458E+01 | 3.2050E−02 | −1.0420E−02 | 7.3882E−03 | −4.7955E−03 | 1.7242E−03 |

| | Conic Coefficient | Aspherical Coefficient | | | | |
|---|---|---|---|---|---|---|
| | k | A14 | A16 | A18 | A20 | A22 |
| R3 | −9.0280E−01 | 1.1412E−02 | −3.0960E−03 | 6.3965E−04 | −9.1482E−05 | 7.9259E−06 |
| R4 | −5.3717E+00 | −5.3657E+01 | 4.7652E+01 | −3.1149E+01 | 1.4888E+01 | −5.1160E+00 |

TABLE 14-continued

| | | | | | | |
|---|---|---|---|---|---|---|
| R5 | 6.3042E+00 | 3.7202E+01 | −5.1528E+01 | 5.1914E+01 | −3.7998E+01 | 1.9960E+01 |
| R6 | 4.3134E+01 | 1.2646E+01 | −2.8316E+01 | 3.5383E+01 | −2.5904E+01 | 1.0404E+01 |
| R9 | −3.3371E+00 | −9.1729E−05 | −1.7307E−05 | 6.0499E−06 | −4.8687E−07 | |
| R10 | −1.6355E+02 | −1.1543E−02 | 1.6396E−03 | −1.2204E−04 | 3.5479E−06 | |
| R11 | −6.6215E+01 | −1.0342E−02 | 1.5659E−03 | −1.2738E−04 | 4.2486E−06 | |
| R12 | −2.2093E+01 | 2.2913E−03 | −3.1575E−04 | 2.4464E−05 | −8.1266E−07 | |
| R13 | −5.9602E+00 | 1.8747E−04 | −2.1499E−05 | 1.4512E−06 | −4.2766E−08 | |
| R14 | −1.4458E+01 | −3.4265E−04 | 3.7943E−05 | −2.1987E−06 | 5.2148E−08 | |

| | Conic Coefficient | Aspherical Coefficient | | | |
|---|---|---|---|---|---|
| | k | A24 | A26 | A28 | A30 |
| R3 | −9.0280E−01 | −2.9932E−07 | −5.7538E−09 | 6.3814E−10 | 4.8461E−12 |
| R4 | −5.3717E+00 | 1.2239E+00 | −1.9207E−01 | 1.7591E−02 | −7.0092E−04 |
| R5 | 6.3042E+00 | −7.3191E+00 | 1.7760E+00 | −2.5587E−01 | 1.6545E−02 |
| R6 | 4.3134E+01 | −1.7717E+00 | 6.4963E−05 | 1.4246E−04 | 3.5856E−05 |

Tables 15 and 16 show design data of the inflection points and arrest points of the lenses in the camera optical lens 40 of the fourth embodiment of the present disclosure.

TABLE 15

| | Amount of Inflexion points | 1st Position of Inflexion points | 2nd Position of Inflexion points | 3rd Position of Inflexion points |
|---|---|---|---|---|
| P2R1 | 2 | 0.915 | 2.035 | / |
| P2R2 | 2 | 1.005 | 1.475 | / |
| P5R1 | 1 | 1.635 | / | / |
| P5R2 | 2 | 1.905 | 2.225 | / |
| P6R1 | 2 | 1.825 | 2.225 | / |
| P6R2 | 1 | 1.735 | / | / |
| P7R1 | 3 | 2.165 | 2.575 | 2.765 |
| P7R2 | 3 | 0.435 | 2.345 | 2.435 |

TABLE 16

| | Amount of Arrest points | 1st Position of Arrest points | 2nd Position of Arrest points |
|---|---|---|---|
| P2R1 | 2 | 1.785 | 2.135 |
| P5R1 | 1 | 2.065 | / |
| P6R2 | 1 | 2.445 | / |
| P7R1 | 1 | 2.885 | / |
| P7R2 | 1 | 0.775 | / |

Figure 14:
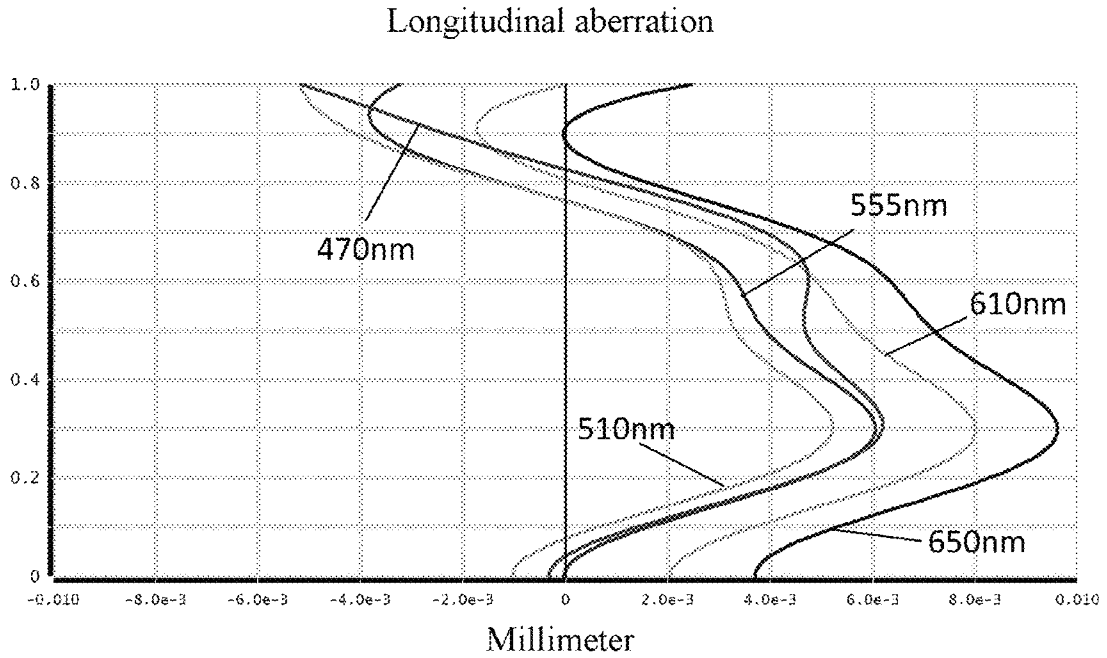
FIG. 14 illustrates the longitudinal aberration of the camera optical lens shown in FIG. 13.
Figure 15:
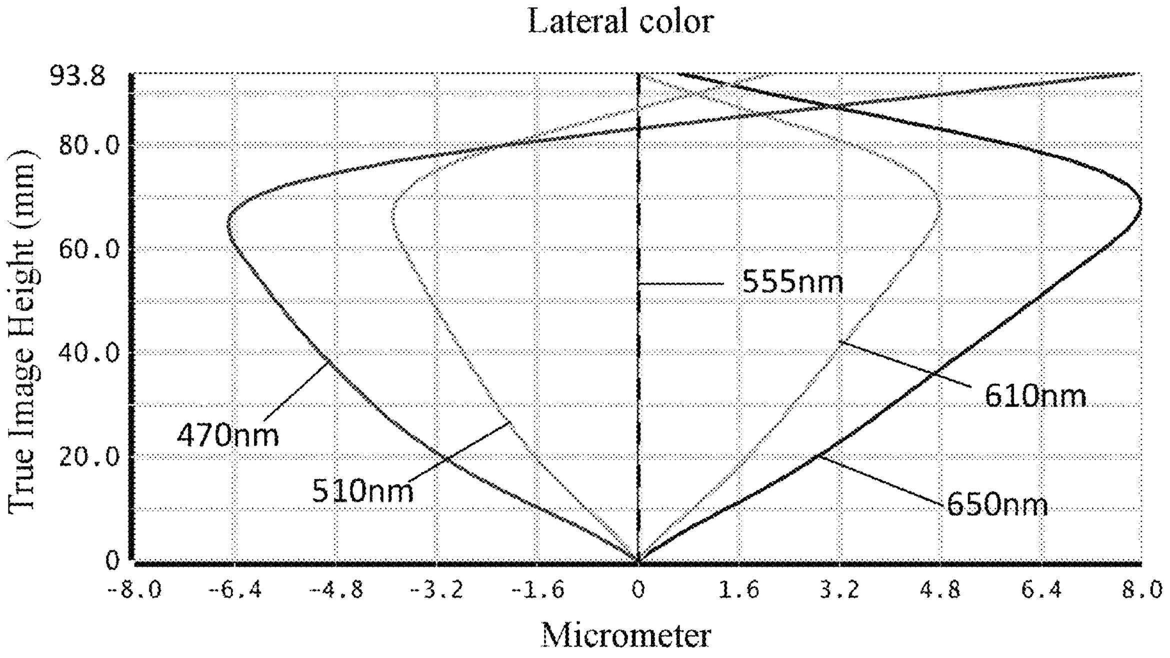
FIG. 15 illustrates the lateral color of the camera optical lens shown in FIG. 13.
Figure 16:
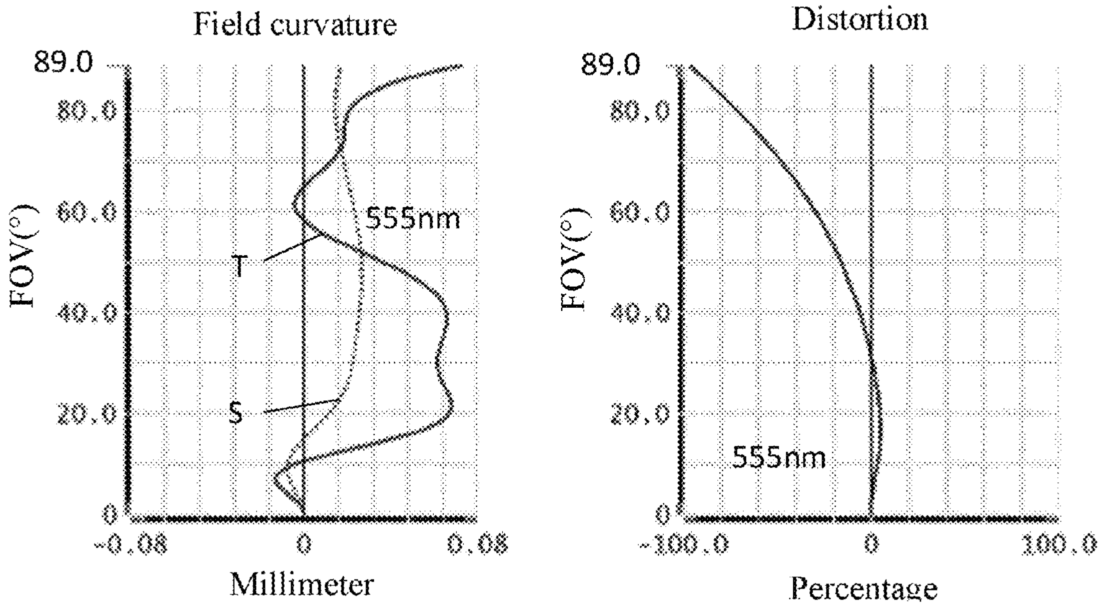
FIG. 16 presents a schematic diagram of the field curvature and distortion of the camera optical lens shown in FIG. 13.

FIG. 14 and FIG. 15 show the longitudinal aberration and lateral color after light with a wavelength respectively of 650 nm, 610 nm, 555 nm, 510 nm and 470 nm passes the camera optical lens 40 in the fourth embodiment. FIG. 16 shows the field curvature and distortion after light with a wavelength of 555 nm passes the camera optical lens 40 in the fourth embodiment, where the field curvature S in FIG. 16 denotes a field curvature in the sagittal direction, and T denotes a field curvature in the meridian direction.

In the present embodiment, the entrance pupil diameter (ENPD) of the camera optical lens 40 is 1.027 mm, the IH is 2.700 mm, and the field of view (FOV) in the diagonal direction is 187.56°. The camera optical lens 40 meets the design requirements of large aperture, wide angle and ultra-thinness, and its on-axis and off-axis chromatic aberrations are fully corrected, and it has excellent optical characteristics.

The following Table 21 shows the values of the various parameters and the specified operation expressions of the first, second, third and fourth embodiments.

Comparative Embodiment

The meanings of the symbols of the comparative embodiment are the same as those of the first embodiment.

Figure 17:
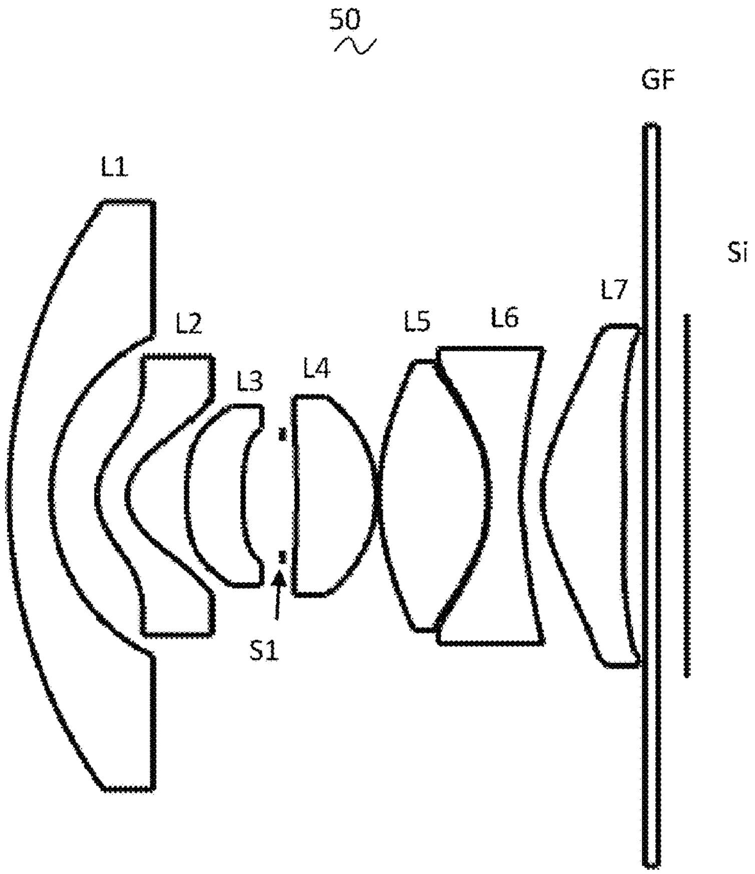
FIG. 17 is a schematic structural diagram of a camera optical lens according to a comparative embodiment of the present disclosure.

FIG. 17 shows a camera optical lens 50 according to the comparative embodiment of the present disclosure.

Tables 17 and 18 show design data of the camera optical lens 50 according to the comparative embodiment of the present disclosure.

TABLE 17

| | R | d | | nd | | vd | |
|---|---|---|---|---|---|---|---|
| S1 | ∞ | d0= | −4.440 | | | | |
| R1 | 8.161 | d1= | 0.684 | nd1 | 1.6610 | v1 | 20.53 |
| R2 | 2.858 | d2= | 0.748 | | | | |
| R3 | 0.990 | d3= | 0.489 | nd2 | 1.5346 | v2 | 55.69 |
| R4 | 0.616 | d4= | 0.964 | | | | |
| R5 | 3.954 | d5= | 0.908 | nd3 | 1.6613 | v3 | 20.37 |
| R6 | 7.380 | d6= | 0.875 | | | | |
| R7 | −20.138 | d7= | 1.302 | nd4 | 1.5928 | v4 | 68.35 |
| R8 | −1.984 | d8= | 0.050 | | | | |
| R9 | 3.876 | d9= | 1.756 | nd5 | 1.5444 | v5 | 55.82 |
| R10 | −3.502 | d10= | 0.030 | | | | |
| R11 | −3.898 | d11= | 0.506 | nd6 | 1.6610 | v6 | 20.53 |
| R12 | 2.754 | d12= | 0.351 | | | | |
| R13 | 1.678 | d13= | 1.337 | nd7 | 1.5444 | v7 | 55.82 |
| R14 | −9.927 | d14= | 0.337 | | | | |
| R15 | ∞ | d15= | 0.210 | ndg | 1.5168 | vg | 64.17 |
| R16 | ∞ | d16= | 0.466 | | | | |

Table 18 shows the aspherical data of the lenses in the camera optical lens 50 of the comparative embodiment of the present disclosure.

TABLE 18

| | Conic Coefficient | Aspherical Coefficient | | | | |
|---|---|---|---|---|---|---|
| | k | A4 | A6 | A8 | A10 | A12 |
| R3 | −9.0236E−01 | −4.8356E−02 | 8.8355E−03 | −8.2786E−02 | 7.0825E−02 | −3.3328E−02 |
| R4 | −4.4021E+00 | 1.5101E+00 | −4.5369E+00 | 1.2392E+01 | −2.7171E+01 | 4.4493E+01 |

TABLE 18-continued

| | | | | | | |
|---|---|---|---|---|---|---|
| R5 | 4.9585E+00 | 3.0159E−02 | 3.0854E−01 | −1.7882E+00 | 7.1284E+00 | −1.9368E+01 |
| R6 | 4.2309E+01 | 7.2762E−02 | −9.7795E−02 | 5.3530E−01 | −7.9249E−01 | −2.0353E+00 |
| R9 | −2.8565E+00 | 5.2730E−03 | −5.0797E−03 | 4.4535E−03 | −2.4717E−03 | 7.7976E−04 |
| R10 | −8.0101E+01 | −1.8431E−01 | 1.1765E−02 | 1.2180E−01 | −1.0870E−01 | 4.6789E−02 |
| R11 | −5.7855E+01 | −2.0331E−01 | 6.3561E−02 | 7.5849E−02 | −8.5389E−02 | 3.9654E−02 |
| R12 | −2.2855E+01 | −8.1076E−02 | 9.3460E−02 | −6.3756E−02 | 3.0853E−02 | −1.0356E−02 |
| R13 | −5.3912E+00 | −4.1207E−03 | 1.3107E−02 | −1.0014E−02 | 4.1362E−03 | −1.0779E−03 |
| R14 | −3.5545E+01 | 3.3671E−02 | −1.1055E−02 | 7.3478E−03 | −4.7958E−03 | 1.7243E−03 |

| | Conic Coefficient | Aspherical Coefficient | | | | |
|---|---|---|---|---|---|---|
| | k | A14 | A16 | A18 | A20 | A22 |
| R3 | −9.0236E−01 | 1.1412E−02 | −3.0959E−03 | 6.3968E−04 | −9.1477E−05 | 7.9270E−06 |
| R4 | −4.4021E+00 | −5.3657E+01 | 4.7652E+01 | −3.1150E+01 | 1.4888E+01 | −5.1160E+00 |
| R5 | 4.9585E+00 | 3.7201E+01 | −5.1528E+01 | 5.1914E+01 | −3.7998E+01 | 1.9960E+01 |
| R6 | 4.2309E+01 | 1.2641E+01 | −2.8320E+01 | 3.5379E+01 | −2.5906E+01 | 1.0404E+01 |
| R9 | −2.8565E+00 | −9.2075E−05 | −1.7138E−05 | 6.0471E−06 | −4.7476E−07 | |
| R10 | −8.0101E+01 | −1.1543E−02 | 1.6396E−03 | −1.2204E−04 | 3.5518E−06 | |
| R11 | −5.7855E+01 | −1.0342E−02 | 1.5658E−03 | −1.2741E−04 | 4.2516E−06 | |
| R12 | −2.2855E+01 | 2.2913E−03 | −3.1575E−04 | 2.4472E−05 | −8.1169E−07 | |
| R13 | −5.3912E+00 | 1.8734E−04 | −2.1489E−05 | 1.4540E−06 | −4.2535E−08 | |
| R14 | −3.5545E+01 | −3.4265E−04 | 3.7944E−05 | −2.1963E−06 | 5.2483E−08 | |

| | Conic Coefficient | Aspherical Coefficient | | | |
|---|---|---|---|---|---|
| | k | A24 | A26 | A28 | A30 |
| R3 | −9.0236E−01 | −2.9918E−07 | −5.7734E−09 | 6.2472E−10 | 2.1842E−13 |
| R4 | −4.4021E+00 | 1.2239E+00 | −1.9207E−01 | 1.7591E−02 | −7.0091E−04 |
| R5 | 4.9585E+00 | −7.3191E+00 | 1.7760E+00 | −2.5587E−01 | 1.6545E−02 |
| R6 | 4.2309E+01 | −1.7721E+00 | 4.0114E−04 | 3.4930E−04 | 8.2516E−05 |

Tables 19 and 20 show design data of the inflection points and arrest points of the lenses in the camera optical lens 50 of the comparative embodiment of the present disclosure.

TABLE 19

| | Amount of Inflexion points | 1st Position of Inflexion points | 2nd Position of Inflexion points | 3rd Position of Inflexion points |
|---|---|---|---|---|
| P2R1 | 3 | 0.915 | 2.055 | 2.085 |
| P2R2 | 2 | 1.035 | 1.475 | / |
| P5R2 | 1 | 1.865 | / | / |
| P6R1 | 1 | 1.845 | / | / |
| P6R2 | 2 | 1.755 | 2.045 | / |
| P7R1 | 2 | 1.895 | 2.435 | / |
| P7R2 | 1 | 0.515 | / | / |

TABLE 20

| | Amount of Arrest points | 1st Position of Arrest points |
|---|---|---|
| P2R1 | 1 | 1.985 |
| P7R2 | 1 | 0.945 |

Figure 18:
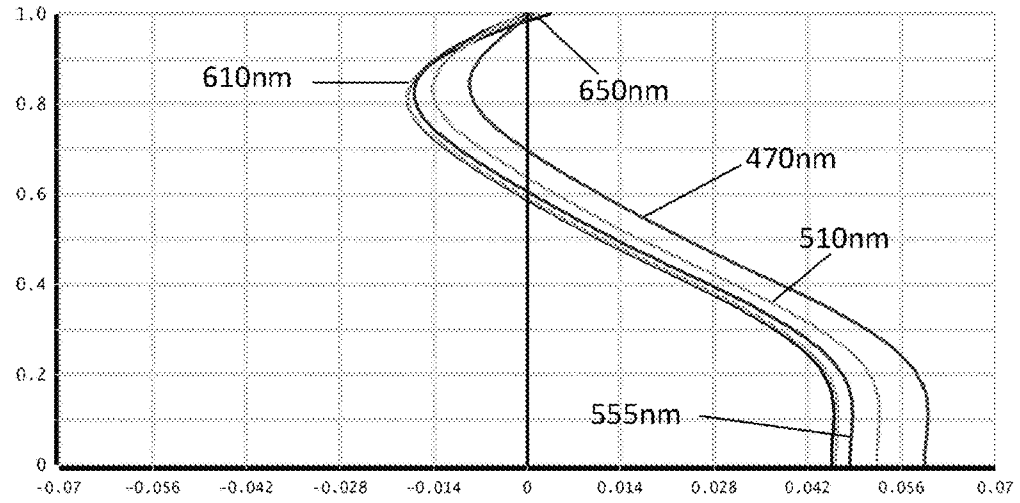
FIG. 18 illustrates the longitudinal aberration of the camera optical lens shown in FIG. 17.
Figure 19:
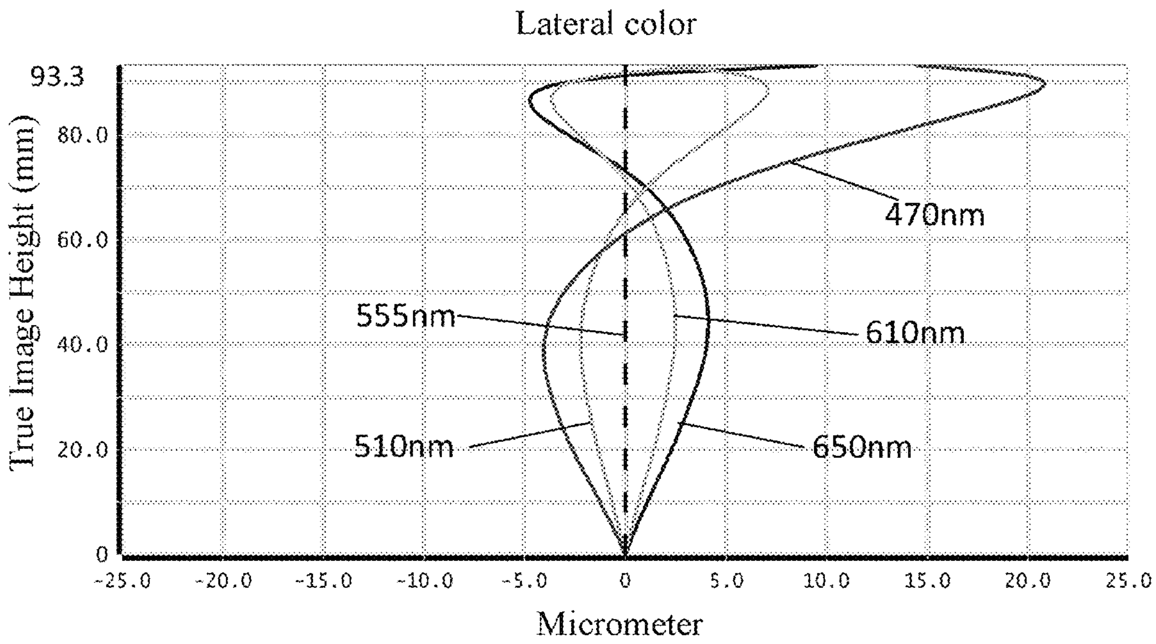
FIG. 19 illustrates the lateral color of the camera optical lens shown in FIG. 17.
Figure 20:
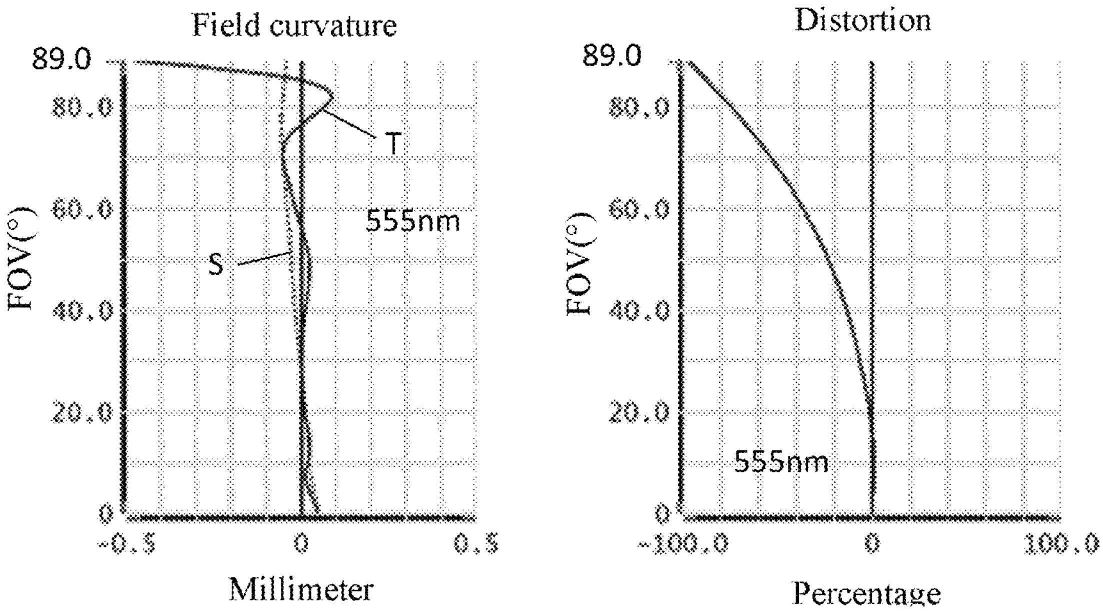
FIG. 20 presents a schematic diagram of the field curvature and distortion of the camera optical lens shown in FIG. 17.

FIG. 18 and FIG. 19 show the longitudinal aberration and lateral color after light with a wavelength respectively of 650 nm, 610 nm, 555 nm, 510 nm and 470 nm passes the camera optical lens 50 in the comparative embodiment. FIG. 20 shows the field curvature and distortion after light with a wavelength of 555 nm passes the camera optical lens 50 in the comparative embodiment, where the field curvature S in FIG. 20 denotes a field curvature in the sagittal direction, and T denotes a field curvature in the meridian direction.

The following Table 21 also shows the values of the specified operation expressions of the comparative embodiment. Obviously, the camera optical lens 50 of the comparative embodiment does not meet the above condition: n1≥1.70.

In the comparative embodiment, the entrance pupil diameter (ENPD) of the camera optical lens 50 is 1.181 mm, the IH is 2.830 mm, and the field of view (FOV) in the diagonal direction is 186.61°. The camera optical lens 50 cannot meet the design requirements of large aperture, wide angle and ultra-thinness.

TABLE 21

| Parameters and Operation Expressions | 1st Embodiment | 2nd Embodiment | 3rd Embodiment | 4th Embodiment | Comparative Embodiment |
|---|---|---|---|---|---|
| n1 | 1.87 | 1.87 | 1.72 | 2.05 | 1.66 |
| d6/TTL | 0.07 | 0.06 | 0.08 | 0.06 | 0.08 |
| (FOV × f)/IH | 109.52 | 127.78 | 100.32 | 102.01 | 111.41 |
| (R13 + R14)/(R13 − R14) | −0.83 | −0.96 | −0.70 | −0.80 | −0.71 |
| f | 1.453 | 1.746 | 1.450 | 1.468 | 1.689 |
| f1 | −4.819 | −5.052 | −5.712 | −4.306 | −6.955 |

TABLE 21-continued

| Parameters and Operation Expressions | 1st Embodiment | 2nd Embodiment | 3rd Embodiment | 4th Embodiment | Comparative Embodiment |
|---|---|---|---|---|---|
| f2 | −6.078 | −7.452 | −5.447 | −5.466 | −5.59 |
| f3 | 12.759 | 11.265 | 13.044 | 12.577 | 11.546 |
| f4 | 3.650 | 3.604 | 3.617 | 3.649 | 3.606 |
| f5 | 4.082 | 4.248 | 3.891 | 4.116 | 3.677 |
| f6 | −2.619 | −2.610 | −2.685 | −2.578 | −2.349 |
| f7 | 2.909 | 3.178 | 2.799 | 2.925 | 2.739 |
| FNO | 1.43 | 1.43 | 1.43 | 1.43 | 1.43 |
| TTL | 11.498 | 11.362 | 11.119 | 12.328 | 11.013 |
| IH | 2.733 | 2.697 | 2.735 | 2.700 | 2.830 |
| FOV | 206.00 | 197.38 | 189.23 | 187.56 | 186.61 |

Those of ordinary skill in the art can understand that the aforementioned embodiments are specific examples for implementing the present disclosure. In practical applications, various modifications can be made to them in form and detail without deviating from the spirit and scope of the present disclosure.

What is claimed is:

1. A camera optical lens, comprising seven lenses, wherein from an object side to an image side, the seven lenses comprise in sequence: a first lens having a negative refractive power, a second lens having a negative refractive power, a third lens having a positive refractive power, a fourth lens having a positive refractive power, a fifth lens having a positive refractive power, a sixth lens having a negative refractive power, and a seventh lens having a positive refractive power;

Wherein an object side surface of the first lens is convex in a paraxial region, and an image side surface of the first lens is concave in the paraxial region;

an object side surface of the second lens is convex in a paraxial region, and an image side surface of the second lens is concave in the paraxial region;

an object side surface of the third lens is convex in a paraxial region, and an image side surface of the third lens is concave in the paraxial region;

an object side surface of the fourth lens is concave in a paraxial region, and an image side surface of the fourth lens is convex in the paraxial region;

an object side surface of the fifth lens is convex in a paraxial region, and an image side surface of the fifth lens is convex in the paraxial region;

an object side surface of the sixth lens is concave in a paraxial region, and an image side surface of the sixth lens is concave in the paraxial region;

an object side surface of the seventh lens is convex in a paraxial region, and an image side surface of the seventh lens is convex in the paraxial region;

wherein n1 denotes a refractive index of the first lens, d6 denotes a distance on-axis between an image side surface of the third lens and an object side surface of the fourth lens, TTL denotes a total track length of the camera optical lens, FOV denotes a field of view of the camera optical lens, f denotes a focal length of the camera optical lens, IH denotes an image height of 1.0H of the camera optical lens, R13 denotes a central curvature radius of an object side surface of the seventh lens, and R14 denotes a central curvature radius of an image side surface of the seventh lens, and the camera optical lens satisfies the following conditions:

$$n1 \geq 1.70;$$

$$0.06 \leq d6/TTL \leq 0.08;$$

$$100.00 \leq (FOV \times f)/IH \leq 130.00;$$

$$-1.00 \leq (R13+R14)/(R13-R14) \leq -0.70.$$

2. The camera optical lens according to claim 1, wherein an Abe number of the fifth lens, denoted as v5, and an Abe number of the sixth lens, denoted as v6, satisfy the following condition:

$$v5-v6 \geq 35.00.$$

3. The camera optical lens according to claim 1, wherein a thickness on-axis of the third lens, denoted as d5, and a thickness on-axis of the fourth lens, denoted as d7, satisfy the following condition:

$$0.35 \leq d5/d7 \leq 0.70.$$

4. The camera optical lens according to claim 1, further satisfying the following condition:

$$6.50 \leq TTL/f \leq 8.50.$$

5. The camera optical lens according to claim 1, wherein f1 denotes a focal length of the first lens, R1 denotes a central curvature radius of the object side surface of the first lens, R2 denotes a central curvature radius of the image side surface of the first lens, and d1 denotes a thickness on-axis of the first lens, and the camera optical lens further satisfies the following conditions:

$$-7.88 \leq f1/f \leq -1.93;$$

$$0.96 \leq (R1+R2)/(R1-R2) \leq 3.01;$$

$$0.02 \leq d1/TTL \leq 0.14.$$

6. The camera optical lens according to claim 1, wherein f2 denotes a focal length of the second lens, R3 denotes a central curvature radius of the object side surface of the second lens, R4 denotes a central curvature radius of the image side surface of the second lens, and d3 denotes a thickness on-axis of the second lens, and the camera optical lens further satisfies the following conditions:

$$-8.54 \le f2/f \le -2.48;$$

$$2.23 \le (R3+R4)/(R3-R4) \le 7.55;$$

$$0.02 \le d3/TTL \le 0.06.$$

7. The camera optical lens according to claim 6, wherein the camera optical lens further satisfies the following conditions:

$$-4.27 \le f2/f \le -3.72;$$

$$4.46 \le (R3+R4)/(R3-R4) \le 5.04.$$

8. The camera optical lens according to claim 1, wherein f3 denotes a focal length of the third lens, R5 denotes a central curvature radius of the object side surface of the third lens, R6 denotes a central curvature radius of the image side surface of the third lens, and d5 denotes a thickness on-axis of the third lens, and the camera optical lens further satisfies the following conditions:

$$3.23 \le f3/f \le 13.49;$$

$$-7.02 \le (R5+R6)/(R5-R6) \le -2.07;$$

$$0.03 \le d5/TTL \le 0.12.$$

9. The camera optical lens according to claim 8, wherein the camera optical lens further satisfies the following conditions:

$$-3.52 \le (R5+R6)/(R5-R6) \le -3.11.$$

10. The camera optical lens according to claim 1, wherein f4 denotes a focal length of the fourth lens, R7 denotes a central curvature radius of the object side surface of the fourth lens, R8 denotes a central curvature radius of the image side surface of the fourth lens, and d7 denotes a thickness on-axis of the fourth lens, and the camera optical lens further satisfies the following conditions:

$$1.03 \le f4/f \le 3.77;$$

$$0.62 \le (R7+R8)/(R7-R8) \le 1.88;$$

$$0.06 \le d7/TTL \le 0.22.$$

11. The camera optical lens according to claim 10, wherein the camera optical lens further satisfies the following conditions:

$$1.23 \le (R7+R8)/(R7-R8) \le 1.26;$$

$$0.11 \le d7/TTL \le 0.15.$$

12. The camera optical lens according to claim 1, wherein f5 denotes a focal length of the fifth lens, R9 denotes a central curvature radius of the object side surface of the fifth lens, R10 denotes a central curvature radius of the image side surface of the fifth lens, and d9 denotes a thickness on-axis of the fifth lens, and the camera optical lens further satisfies the following conditions:

$$1.22 \le f5/f \le 4.21;$$

$$-0.15 \le (R9+R10)/(R9-R10) \le 0.08;$$

$$0.08 \le d9/TTL \le 0.25.$$

13. The camera optical lens according to claim 12, wherein the camera optical lens further satisfies the following conditions:

$$2.43 \le f5/f \le 2.81;$$

$$0.15 \le d9/TTL \le 0.17.$$

14. The camera optical lens according to claim 1, wherein the first lens is made of glass material and the fourth lens is made of glass material.

15. The camera optical lens according to claim 1, wherein f6 denotes a focal length of the sixth lens, R11 denotes a central curvature radius of the object side surface of the sixth lens, R12denotes a central curvature radius of the image side surface of the sixth lens, and d11 denotes a thickness on-axis of the sixth lens, and the camera optical lens further satisfies the following conditions:

$$-1.86 \le f6/f \le -1.49;$$

$$0.17 \le (R11+R12)/(R11-R12) \le 1.29;$$

$$0.049 \le d11/TTL \le 0.061.$$

16. The camera optical lens according to claim 1, wherein f7 denotes a focal length of the seventh lens, d13 denotes a thickness on-axis of the seventh lens, and the camera optical lens further satisfies the following conditions:

$$1.82 \le f7/f \le 2.01;$$

$$0.11 \le d13/TTL \le 0.13.$$

* * * * *